(12) United States Patent
Kitano et al.

(10) Patent No.: US 11,972,317 B2
(45) Date of Patent: Apr. 30, 2024

(54) IMAGE PROCESSING DEVICE AND MOBILE BODY CONTROL SYSTEM

(71) Applicant: THK CO., LTD., Tokyo (JP)

(72) Inventors: Hitoshi Kitano, Tokyo (JP); Tsubasa Usui, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/764,176

(22) PCT Filed: Sep. 23, 2020

(86) PCT No.: PCT/JP2020/035725
§ 371 (c)(1),
(2) Date: Mar. 26, 2022

(87) PCT Pub. No.: WO2021/065598
PCT Pub. Date: Apr. 8, 2021

(65) Prior Publication Data
US 2022/0358303 A1 Nov. 10, 2022

(30) Foreign Application Priority Data
Oct. 3, 2019 (JP) .................. 2019-182980

(51) Int. Cl.
*G06K 7/14* (2006.01)
(52) U.S. Cl.
CPC .................. *G06K 7/1417* (2013.01)
(58) Field of Classification Search
CPC .... G06K 7/1417; G06V 20/56; G05D 1/0234; G05D 1/0253; G05D 2201/0216; G06T 7/0002

See application file for complete search history.

(56) References Cited

U.S. PATENT DOCUMENTS

| 2002/0020747 A1 | 2/2002 | Wakamiya et al. |
| 2010/0019042 A1* | 1/2010 | Barkan ............ G06K 7/10722 235/462.43 |
| 2019/0098233 A1 | 3/2019 | Gassend et al. |

FOREIGN PATENT DOCUMENTS

| JP | 2001-291051 A | 10/2001 |
| JP | 2014-021624 A | 2/2014 |

(Continued)

OTHER PUBLICATIONS

International Search Report dated Nov. 24, 2020, issued in counterpart International application No. PCT/JP2020/035725, with English translation. (4 pages).

(Continued)

*Primary Examiner* — Matthew Mikels
(74) *Attorney, Agent, or Firm* — WHDA, LLP

(57) ABSTRACT

An image processing device includes: a first scan of first area of an image acquired on the basis of reflective light of light emitted to the outside of a mobile body in first direction; a first determination of whether or not a first condition is satisfied on the basis of result by the first scan; a second scan of second area of the image in second direction different from the first direction in a case in which the first determination determines that the first condition is satisfied; a second determination of whether or not a second condition is satisfied on the basis of result by the second scan; a third scan of third area of the image after the second determination determines that the second condition is satisfied; and a third determination of whether or not predetermined information is included in the third area scanned by the third scan.

10 Claims, 22 Drawing Sheets

(56) References Cited

FOREIGN PATENT DOCUMENTS

| | | |
|---|---|---|
| JP | 2019-102047 A | 6/2019 |
| TW | 201915816 A | 4/2019 |

OTHER PUBLICATIONS

Office Action dated Mar. 7, 2024, issued in counterpart Taiwan patent application No. 109133572, with partial English translation. (9 pages).

* cited by examiner

| MARKER ID | PREDETERMINED OPERATION | MARKER DISTANCE | ROTATION ANGLE |
|---|---|---|---|
| 0 | STOP | 1m | 0 DEGREES |
| 1 | STOP | 1m | TURNING RIGHT BY 180 DEGREES |
| 2 | MOVE STRAIGHT | 1m | 0 DEGREES |
| 3 | ROTATION | 1m | TURNING RIGHT BY 90 DEGREES |
| 4 | ROTATION | 1m | TURNING LEFT BY 90 DEGREES |
| 5 | ... | ... | ... |
| 6 | ... | ... | ... |
| 7 | ... | ... | ... |
| 8 | ... | ... | ... |
| 9 | ... | ... | ... |
| 10 | ... | ... | ... |
| 11 | ... | ... | ... |
| 12 | ... | ... | ... |
| 13 | ... | ... | ... |
| 14 | ... | ... | ... |
| 15 | ... | ... | ... |

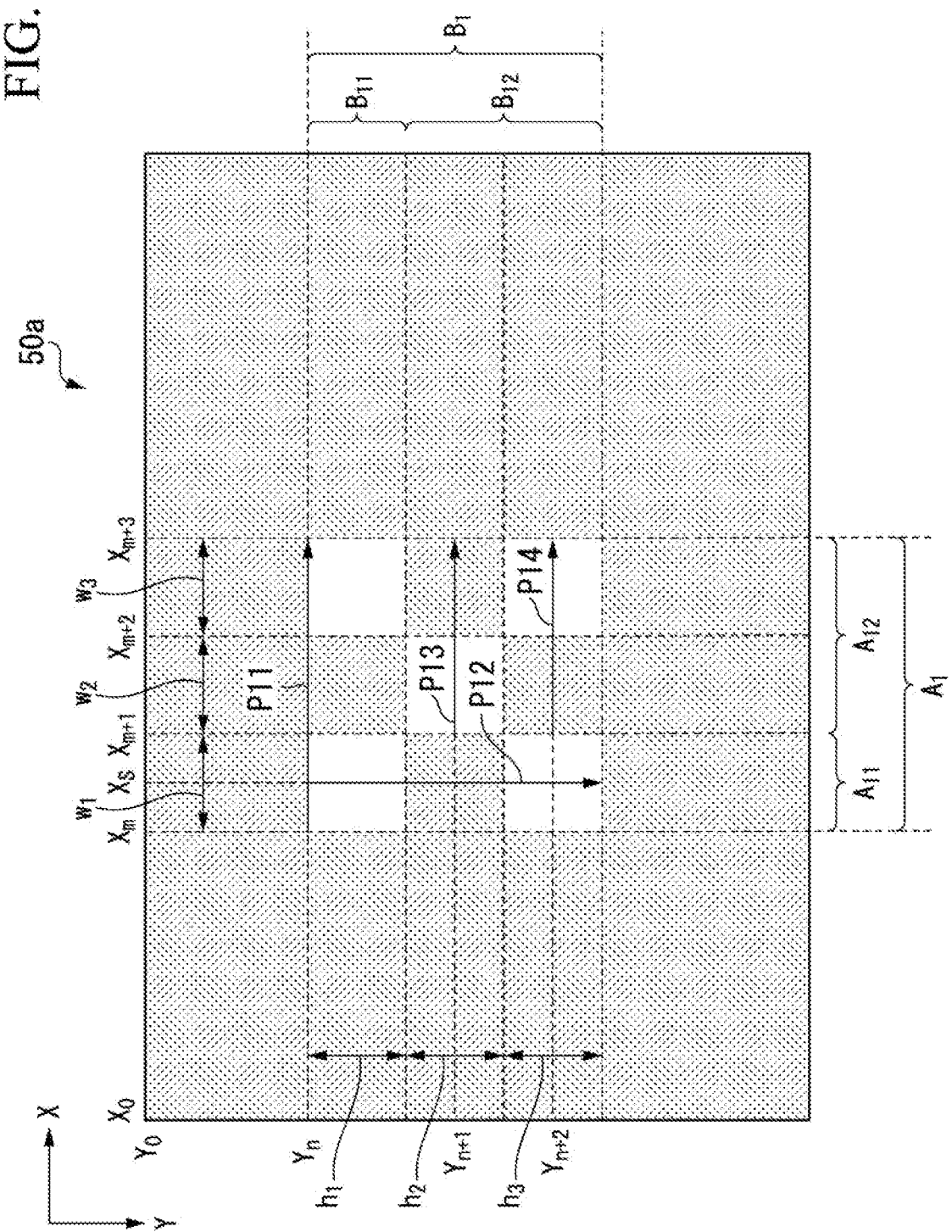

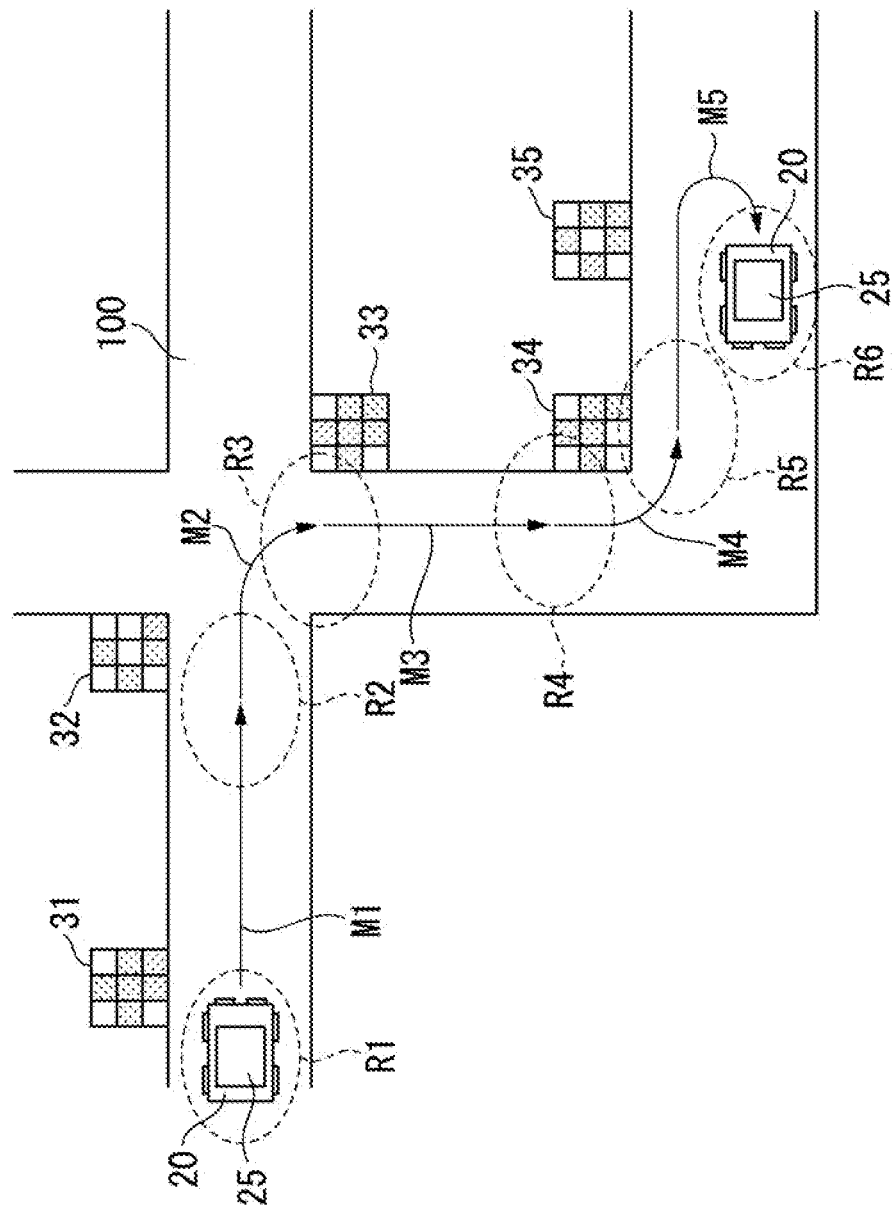

FIG. 13

| MARKER ID | PREDETERMINED OPERATION | MARKER DISTANCE | ROTATION ANGLE |
|---|---|---|---|
| 0 | STOP | 1m | 0 DEGREES |
| 1 | STOP | 1m | TURNING RIGHT BY 180 DEGREES |
| 2 | MOVE STRAIGHT | 1m | 0 DEGREES |
| 3 | ROTATION | 1m | TURNING RIGHT BY 90 DEGREES |
| 4 | ROTATION | 1m | TURNING LEFT BY 90 DEGREES |
| 5 | ... | ... | ... |
| 6 | ... | ... | ... |
| 7 | ... | ... | ... |
| 8 | ... | ... | ... |
| 9 | ... | ... | ... |
| 10 | ... | ... | ... |
| 253 | ... | ... | ... |
| 254 | ... | ... | ... |
| 255 | ... | ... | ... |

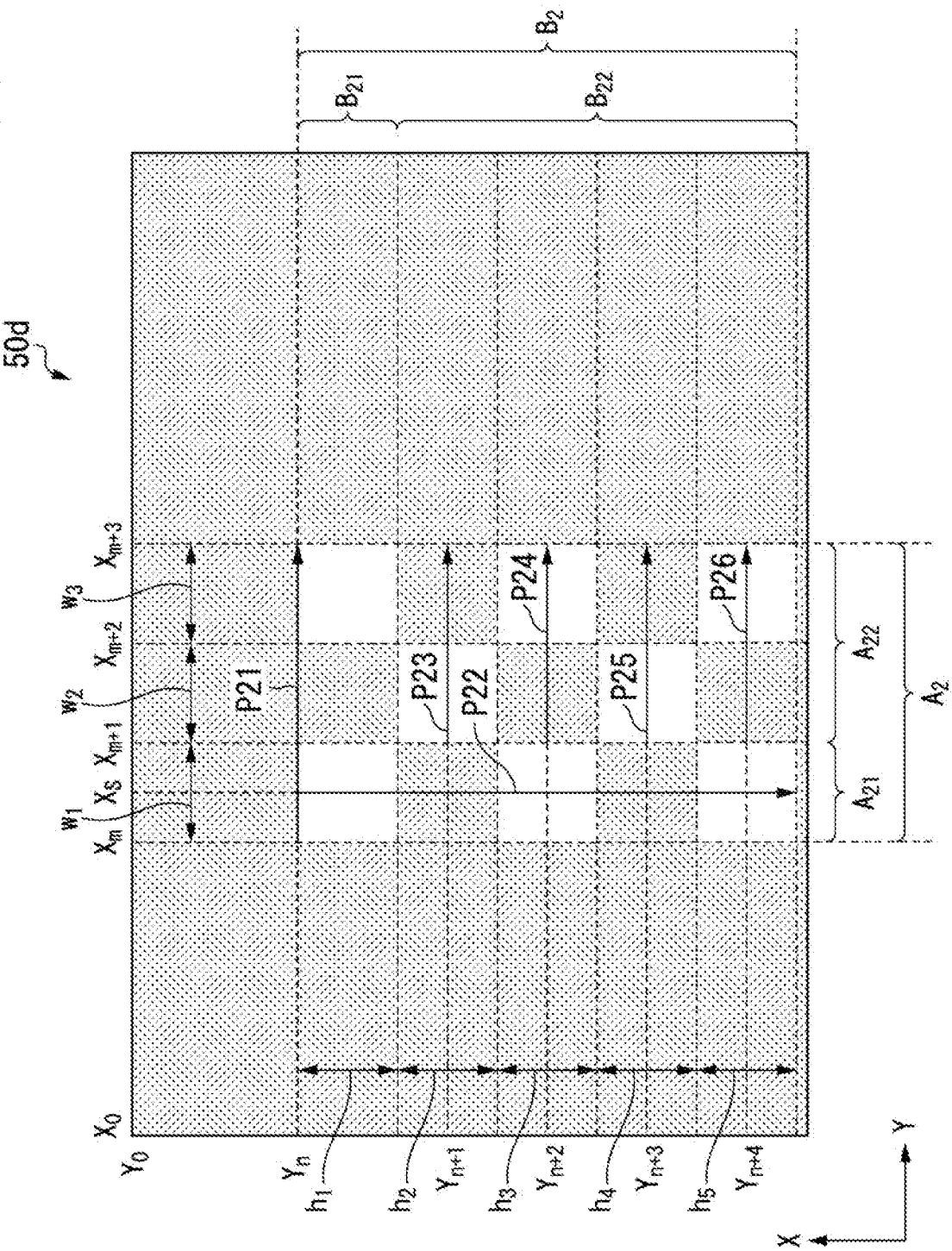

FIG. 18

| MARKER ID | PREDETERMINED OPERATION | MARKER DISTANCE | ROTATION ANGLE |
|---|---|---|---|
| 0 | STOP | 1m | 0 DEGREES |
| 1 | STOP | 1m | TURNING RIGHT BY 180 DEGREES |
| 2 | MOVE STRAIGHT | 1m | 0 DEGREES |
| 3 | ROTATION | 1m | TURNING RIGHT BY 90 DEGREES |
| 4 | ROTATION | 1m | TURNING LEFT BY 90 DEGREES |
| 5 | ... | ... | ... |
| 6 | ... | ... | ... |
| 7 | ... | ... | ... |
| 8 | ... | ... | ... |
| 9 | ... | ... | ... |
| 10 | ... | ... | ... |
| 61 | ... | ... | ... |
| 62 | ... | ... | ... |
| 63 | ... | ... | ... | ced image
IMAGE PROCESSING DEVICE AND MOBILE BODY CONTROL SYSTEM

TECHNICAL FIELD

The present invention relates to an image processing device and a mobile body control system.

CROSS-REFERENCE TO RELATED APPLICATION

This application is a National Phase Application filed under 35 U.S.C. § 371 of International Application No. PCT/JP2020/035725 filed on Sep. 23, 2020 which claims the benefit of priorities under 35 U.S.C. 119(a) of Japanese Patent Application No. 2019-182980 filed in Japan on Oct. 3, 2019, the contents of which are incorporated herein by reference.

BACKGROUND ART

Conventionally, a mobile body control system that loads a package into a mobile body and causes the mobile body to convey the package from a departure position to a target position without any person riding on the mobile body such as a robot is known.

For example, Patent Literature 1 discloses a technology for controlling an operation of a mobile body by arranging markers in a passage through which the mobile body passes and imaging the markers using an imaging unit such as a camera disposed in the mobile body.

In Patent Literature 1, in a case in which an imaging unit disposed in a mobile body cannot image a marker from the front, by performing image processing, a corrected image assumed to be acquired in a case in which the marker is imaged by the imaging unit from the front is generated.

CITATION LIST

Patent Literature

[Patent Literature 1]
Japanese Unexamined Patent Application, First Publication No. 2014-21624

SUMMARY OF INVENTION

Technical Problem

In the mobile body control system disclosed in Patent Literature 1, in a case in which a marker disposed in a passage of a mobile body cannot be imaged from the front, by performing image processing, a corrected image assumed to be acquired in a case in which the marker is imaged from the front is generated. Thus, the processing load of an image processing device disposed in the mobile body is heavy.

The present invention is in view of the problem described above, and an object thereof is to provide an image processing device and a mobile body control system capable of detecting a marker without increasing a load of image processing even in a case in which the marker disposed in a passage of a mobile body cannot be imaged from the front, and a width or a height of an image of the imaged marker is short.

Solution to Problem

An image processing device according to one aspect of the present invention includes: a first scanning unit configured to scan a first area of an image acquired on the basis of reflective light of light emitted to the outside of a mobile body in a first direction; a first determination unit configured to determine whether or not a first condition is satisfied on the basis of a first scanning result acquired by the first scanning unit; a second scanning unit configured to scan a second area of the image in a second direction different from the first direction in a case in which the first determination unit determines that the first condition is satisfied; a second determination unit configured to determine whether or not a second condition is satisfied on the basis of a second scanning result acquired by the second scanning unit; a third scanning unit configured to scan a third area of the image after the second determination unit determines that the second condition is satisfied; and a third determination unit configured to determine whether or not predetermined information is included in the third area scanned by the third scanning unit.

In addition, a mobile body control system according to one aspect of the present invention is a mobile body control system including: a marker including a plurality of pieces of first information and a plurality of pieces of second information arranged in a matrix shape; and a mobile body, in which, the mobile body includes: an emission unit configured to emit light to the marker; an imaging unit configured to capture an image on the basis of reflective light of the light emitted by the emission unit; a first scanning unit configured to scan a first area of the image in a first direction; a first determination unit configured to determine whether or not a first condition is satisfied on the basis of a first scanning result acquired by the first scanning unit; a second scanning unit configured to scan a second area of the image in a second direction different from the first direction in a case in which the first determination unit determines that the first condition is satisfied; a second determination unit configured to determine whether or not a second condition is satisfied on the basis of a second scanning result acquired by the second scanning unit; a third scanning unit configured to scan a third area of the image after the second determination unit determines that the second condition is satisfied; and a third determination unit configured to determine whether or not predetermined information is included in the third area scanned by the third scanning unit.

Advantageous Effects of Invention

According to the present invention, a marker can be detected without increasing a load of image processing even in a case in which the marker disposed in a passage of a mobile body cannot be imaged from the front, and a width or a height of an image of the imaged marker is short.

BRIEF DESCRIPTION OF DRAWINGS

FIG. 6 is a diagram illustrating a process performed using an image processing unit according to the first embodiment of the present invention.

FIG. 7 is a diagram illustrating an example of an operation of the mobile body according to the first embodiment of the present invention.

FIG. 13 is a diagram illustrating an example of information stored by a storage unit according to the third embodiment of the present invention.

FIG. 16 is a diagram illustrating a process performed using an image processing unit according to the third embodiment of the present invention.

FIG. 18 is a diagram illustrating an example of information stored by a storage unit according to the fourth embodiment of the present invention.

DESCRIPTION OF EMBODIMENTS

Hereinafter, embodiments of the present invention will be described with reference to drawings. The embodiments illustrated below are described as examples for easy understanding of the concept of the invention and are not for the purpose of limiting the present invention unless mentioned otherwise.

First Embodiment

First, a first embodiment of the present invention will be described.

Figure 1:
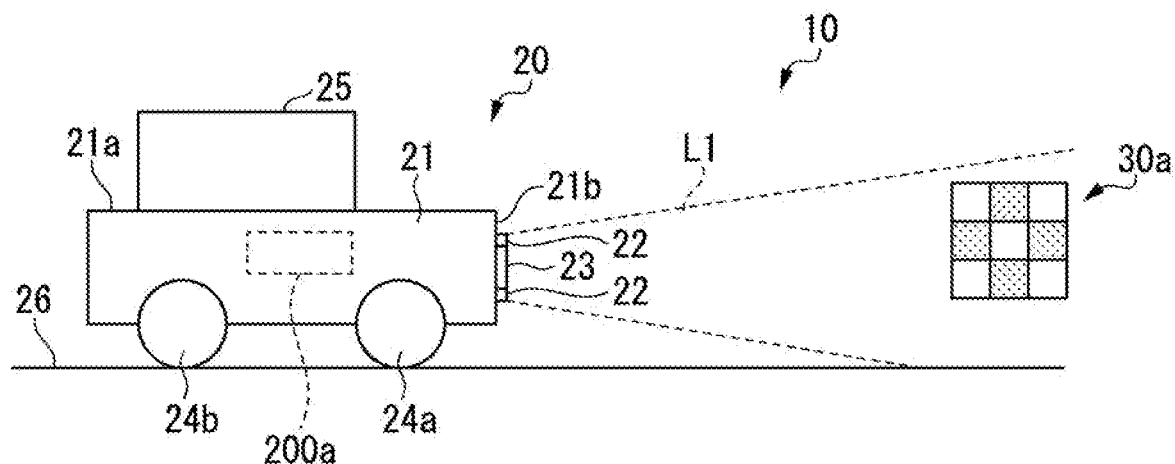
FIG. 1 is a diagram illustrating an overview of a mobile body control system according to a first embodiment of the present invention.

FIG. 1 is a diagram illustrating an overview of a mobile body control system 10 according to the first embodiment of the present invention. The mobile body control system 10 includes a mobile body 20 and a marker 30a.

The mobile body 20 includes a vehicle body 21, emission units 22, an imaging unit 23, front wheel tires 24a, rear wheel tires 24b, and a mobile body control device 200a.

The mobile body 20 is an unmanned vehicle-type robot used for conveying a package 25 from a departure position to a target position by loading a package 25 on an upper face 21a of the vehicle body 21 and traveling on a floor 26 of a facility such as factory.

The vehicle body 21, for example, has a rectangular parallelopiped shape, and the package 25 can be loaded on the upper face 21a of the vehicle body 21, which can proceed in the direction of a front face 21b of the vehicle body 21.

The emission unit 22 is a light emitting diode (LED) that emits infrared light L1 or the like. The emission unit 22 is arranged in a ring shape on the front face 21b of the vehicle body 21. Two emission units 22 are disposed in a direction vertical to the sheet surface of FIG. 1. The infrared light L1 emitted by the emission units 22 is emitted to the marker 30a and the like positioned on the side in front of the mobile body 20.

The imaging unit 23 is a camera capturing an image or the like. The imaging unit 23 is disposed on the front face 21b of the vehicle body 21. The imaging unit 23 is disposed in an area disposed on an inner side of the emission units 22 arranged in a ring shape. The imaging unit 23 generates an image by imaging reflective light acquired by reflecting the infrared light L1 emitted by the emission unit 22 on the marker 30a and the like. Since two imaging units 23 are disposed on the front face 21b of the mobile body 20, the mobile body 20 can calculate a distance to the marker 30a using the principle of triangulation.

The front wheel tires 24a are formed from two independent casters, and these two casters are not connected to a power source such as a motor. In addition, the rear wheel tires 24b are formed from two independent casters, and power is transferred from different power sources such as motors to such two casters. In addition, the mobile body control device 200a controls a traveling direction of the mobile body 20 by controlling rotation speeds of the two casters configuring the rear wheel tires 24b.

Here, although a case in which the mobile body 20 includes a total of four tires including the two front wheel tires 24a and the two rear wheel tires 24b is described, more tires may be disposed in the mobile body 20. For example, tires (in other words, two independent casters) similar to the front wheel tires 24a may be additionally disposed not only on the side in front of the rear wheel tires 24b illustrated in FIG. 1 but also on the side in rear thereof, whereby the mobile body 20 may include a total of six tires.

The mobile body control device 200a controls operations (translation, turning, and the like) of the mobile body 20. The mobile body control device 200a is built into the inside of the vehicle body 21 of the mobile body 20.

The marker 30a includes a plurality of pieces of first information and a plurality of pieces of second information. More specifically, the marker 30a is formed from a plurality of reflection cells and a plurality of light absorption cells and forms a sheet shape. The marker 30a is attached to a wall, a ceiling, or the like of a factory or the like. The marker 30a is used for the mobile body 20 to identify control information for performing operations such as translation, turning, and the like of the mobile body 20.

Figure 2:
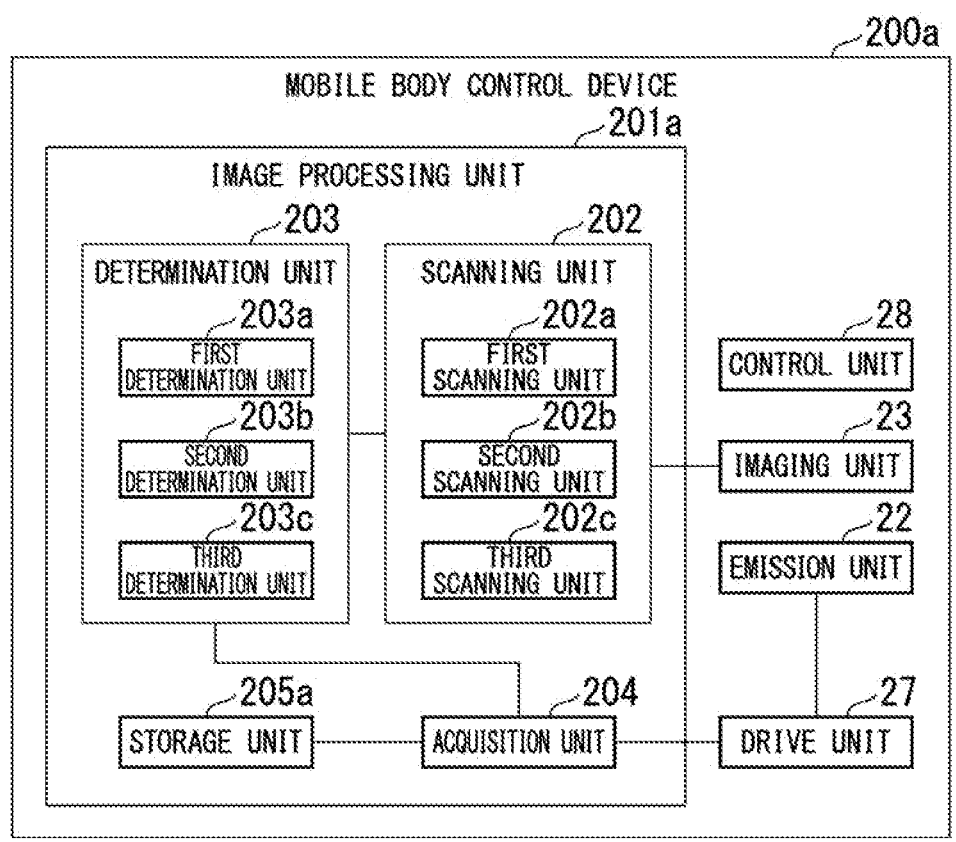
FIG. 2 is a block diagram illustrating the configuration of a mobile body control device built into a mobile body according to the first embodiment of the present invention.

FIG. 2 is a block diagram illustrating the configuration of the mobile body control device 200a built into the mobile body 20 according to the first embodiment of the present invention.

The mobile body control device 200a includes an emission unit 22, an imaging unit 23, an image processing unit 201a (also referred to as an image processing device), a drive unit 27, and a control unit 28.

The emission unit 22 is the emission unit 22 illustrated in FIG. 1. For example, the emission unit 22 emits the infrared light L1 (FIG. 1) to the outside of the mobile body 20 while the drive unit 27 rotates the rear wheel tires 24b.

The imaging unit 23 is the imaging unit 23 illustrated in FIG. 1. The imaging unit 23 captures reflective light of the infrared light L1 emitted by the emission unit 22, for example, reflective light from the marker 30a (FIG. 1) and generates an image having a rectangular shape.

The image processing unit 201a includes a scanning unit 202, a determination unit 203, an acquisition unit 204, and a storage unit 205a.

The scanning unit 202 scans a rectangular image captured by the imaging unit 23 in an X axis direction (also referred to as a first direction) and a Y axis direction (also referred to as a second direction) and acquires data representing whether scanned coordinates of pixels represent a white color (also referred to as first information) or a black color (also referred to as second information).

In addition, the scanning unit 202 includes a first scanning unit 202a, a second scanning unit 202b, and a third scanning unit 202c.

The determination unit 203 determines whether or not a pattern of a predetermined white color and a black color (the first information and the second information) is included in a scanning result on the basis of the scanning result acquired by the scanning unit 202 through scanning. In addition, the determination unit 203 includes a first determination unit 203a, a second determination unit 203b, and a third determination unit 203c.

The acquisition unit 204 reads control information used for controlling the operation of the mobile body 20 from the storage unit 205a on the basis of a scanning result acquired by the third scanning unit 202c and a determination result acquired by the third determination unit 203c.

The storage unit 205a is a storage device such as a memory.

The drive unit 27 controls operations of the mobile body 20 such as translation (the number of rotations of the two casters configuring the rear wheel tires 24b) and turning (rotation speeds of the two casters configuring the rear wheel tires 24b) on the basis of control information that is acquired by the acquisition unit 204 and is stored in the storage unit 205a.

The control unit 28 is a central processing unit (CPU) or the like and controls each unit of the mobile body control device 200a and each unit of the image processing unit 201a.

Figures 3, 4:
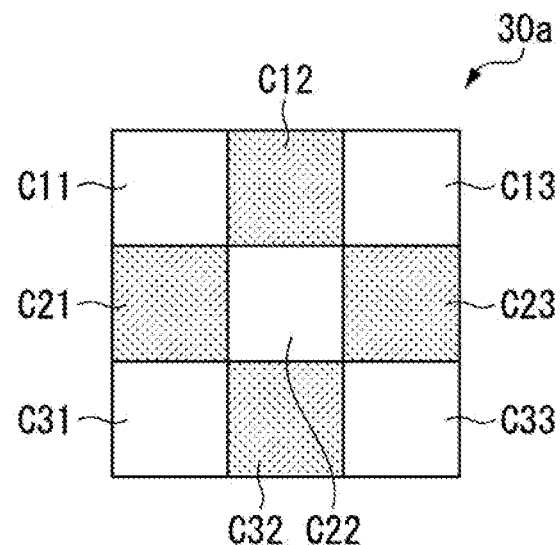
FIG. 3 is a diagram illustrating an example of information stored by a storage unit according to the first embodiment of the present invention.
FIG. 4 is a diagram illustrating the configuration of a marker according to the first embodiment of the present invention.

FIG. 3 is a diagram illustrating an example of information stored by the storage unit 205a (FIG. 2) according to the first embodiment of the present invention.

In FIG. 3, control information such as a predetermined operation (for example, stop), a marker distance (for example, 1 m), and a rotation angle (for example, 0 degrees) are associated with a marker ID (for example, 0). In FIG. 3, only control information of which marker IDs are 0 to 4 is represented, and details of control information of which marker IDs are 5 to 15 are not illustrated.

In the table of FIG. 3, marker IDs 0 to 15 are included. In other words, a total of 16 marker IDs are included in the table of FIG. 3, and thus control information of 16 kinds can be set.

For example, in a case in which the acquisition unit 204 reads information of which a marker ID is 0 from the storage unit 205a and outputs the read information to the drive unit 27, the mobile body 20 is translated up to a position at which a distance between the mobile body 20 and the marker 30a is a marker distance (that is, 1 m) without rotating (in other words, a rotation angle of 0 degrees) until the next marker is read and performs a predetermined operation (that is, stopping).

FIG. 4 is a diagram illustrating the configuration of the marker 30a according to the first embodiment of the present invention.

The marker 30a is formed from a pattern of a matrix shape of 3 rows×3 columns. More specifically, the marker 30a includes a reflective cell C11 of the first row and the first column, a light absorption cell C12 of the first row and the second column, and a reflective cell C13 of the first row and the third column. In addition, the marker 30a includes a light absorption cell C21 of the second row and the first column, a reflective cell C22 of the second row and the second column, and a light absorption cell C23 of the second row and the third column. Furthermore, the marker 30a includes a reflective cell C31 of the third row and the first column, a light absorption cell C32 of the third row and the second column, and a reflective cell C33 of the third row and the third column.

In addition, the reflective cells C11, C13, C22, C31, and C33 are formed using a material having high light reflectivity. Furthermore, the light absorption cells C12, C21, C23, and C32 are formed using a material having low light reflectivity.

Figure 5A:
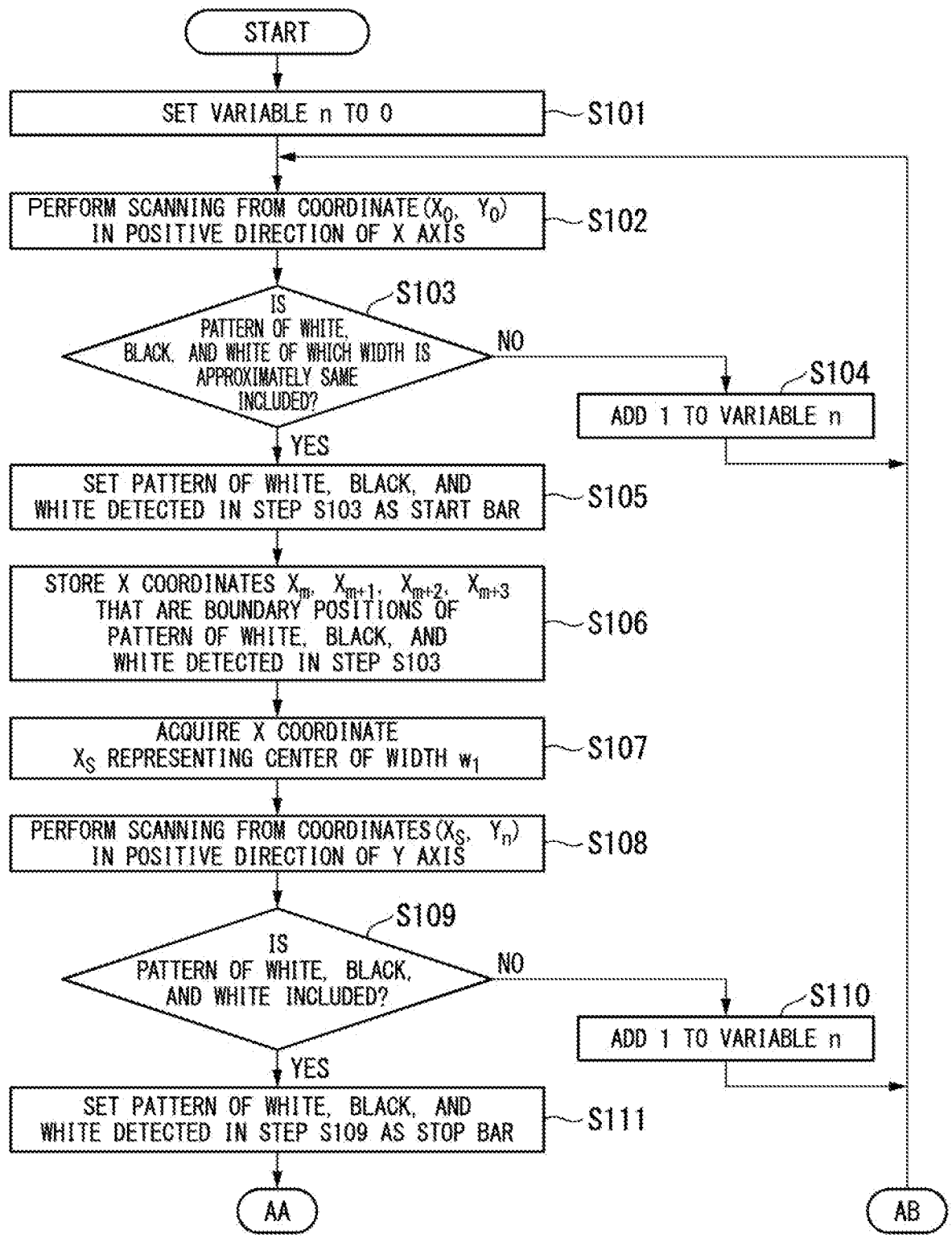
FIG. 5A is a flowchart illustrating a process of the mobile body control device according to the first embodiment of the present invention.
Figure 5B:
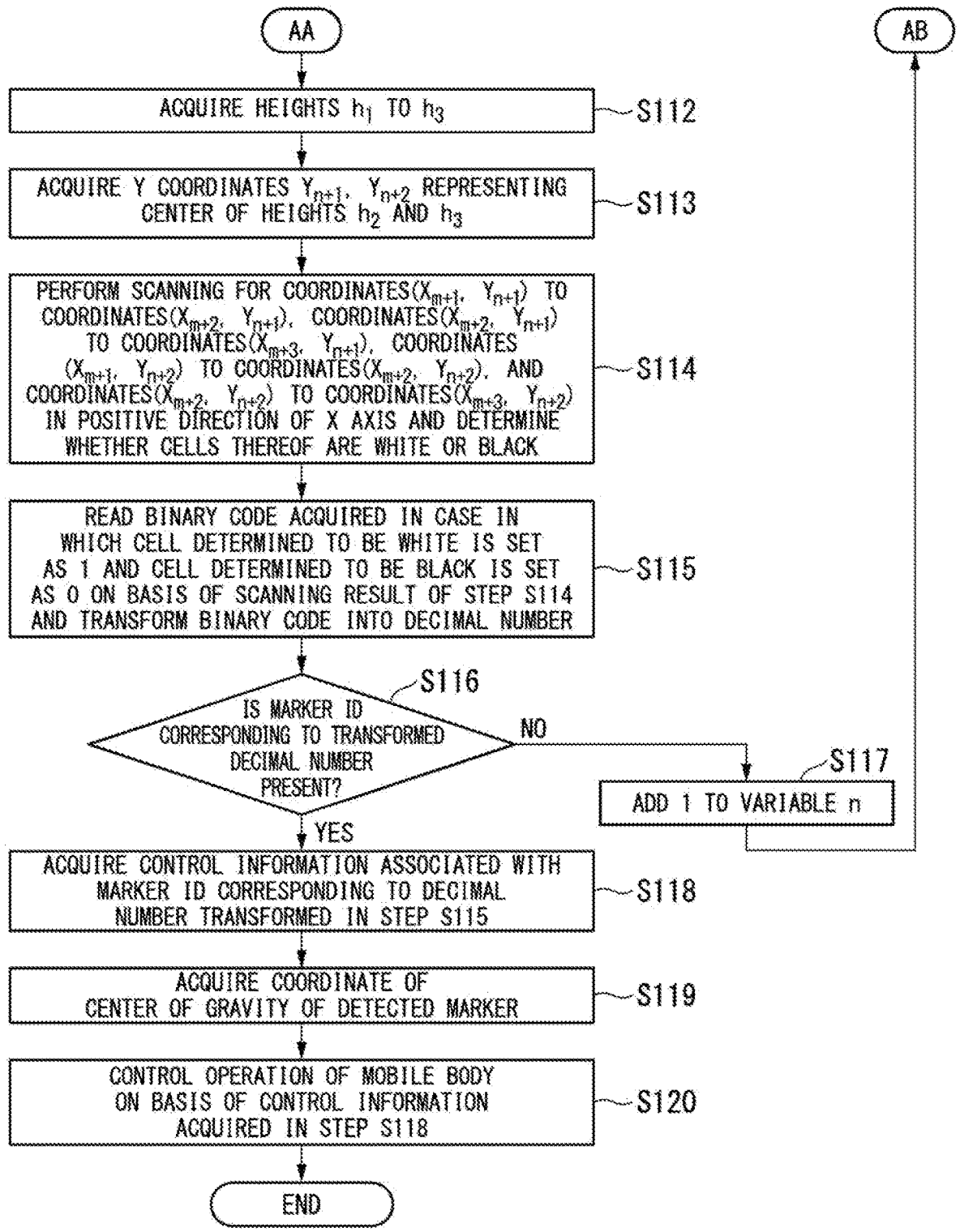
FIG. 5B is a flowchart illustrating a process of the mobile body control device according to the first embodiment of the present invention.

FIGS. 5A and 5B represent a flowchart illustrating a process of the mobile body control device 200a (FIG. 2) according to the first embodiment of the present invention.

First, the first scanning unit 202a sets a variable n to 0 (Step S101 illustrated in FIG. 5A).

Next, the first scanning unit 202a scans an image captured by the imaging unit 23 from coordinates $(X_0, Y_n)$ in the positive direction of the X axis (Step S102 illustrated in FIG. 5A).

Next, the first determination unit 203a determines whether or not a pattern of a white color, a black color, and a white color having approximately the same width is included in the scanning result acquired by the first scanning unit 202a in Step S102 (Step S103 illustrated in FIG. 5A). Here, the pattern of a white color, a black color, and a white color having approximately the same width is a pattern in which, when a width $w_1$ of the white color detected first (see FIG. 6 to be described below) is set to 1, each of a width $w_2$ of the black color and a width $w_3$ of the white color detected thereafter is larger than $w_1 \times 0.9$ and smaller than $w_1 \times 1.1$ or the like. The sign "×" represents an operator of multiplication.

In Step S102, in a case in which the first determination unit 203a determines that the pattern of the white color, the black color, and the white color having approximately the same width is not included in the scanning result acquired by the first scanning unit 202a (No in Step S103 illustrated in FIG. 5A), the process of Step S104 is performed.

In other words, the first scanning unit 202a adds 1 to the variable n (Step S104 illustrated in FIG. 5A), and the process of Step S102 described above is performed again.

On the other hand, in Step S102, in a case in which the first determination unit 203a determines that the pattern of the white color, the black color, and the white color having approximately the same width is included in the scanning result acquired by the first scanning unit 202a (Yes in Step S103 illustrated in FIG. 5A), the process of Step S105 is performed.

In other words, the first determination unit 203a regards the pattern of the white color, the black color, and the white color detected in Step S103 as the reflective cell C11, the light absorption cell C12, and the reflective cell C13 of the marker 30a (FIG. 4) and sets the pattern of the white color, the black color, and the white color detected in Step S103 as a start bar (Step S105 illustrated in FIG. 5A).

Next, the first determination unit 203a stores X coordinates $X_m$, $X_{m+1}$, $X_{m+2}$, and $X_{m+3}$ (see FIG. 6 described below) that are boundary positions of the pattern of the white color, the black color, and the white color detected in Step S103 in the storage unit 205a (Step S106 illustrated in FIG. 5A).

Next, the first determination unit 203a acquires an X coordinate $X_S$ (see FIG. 6 described below) representing the center of the width $w_1$ (Step S107 illustrated in FIG. 5A).

Next, the second scanning unit 202b scans an image captured by the imaging unit 23 from coordinates $(X_S, Y_n)$ in the positive direction of the Y axis (Step S108 illustrated in FIG. 5A).

Next, the second determination unit 203b determines whether or not the pattern of the white color, the black color, and the white color is included in a scanning result acquired by the second scanning unit 202b in Step S108 (Step S109 illustrated in FIG. 5A).

In a case in which the second determination unit 203b determines that the pattern of the white color, the black color, and the white color is not included (No in Step S109 illustrated in FIG. 5A), the process of Step S110 is performed.

In other words, the second scanning unit 202b adds 1 to the variable n (Step S110 illustrated in FIG. 5A) and performs the process of Step S102 described above again.

On the other hand, in a case in which the second determination unit 203b determines that the pattern of the white color, the black color, and the white color is included (Yes in Step S109 illustrated in FIG. 5A), the process of Step S111 is performed.

In other words, the second determination unit 203b regards the pattern of the white color, the black color, and the white color detected in Step S109 as the reflective cell C11, the light absorption cell C21, and the reflective cell C31 of the marker 30a (FIG. 4) and sets the pattern of the white color, the black color, and the white color detected in Step S109 as a stop bar (Step S111 illustrated in FIG. 5A).

Next, the second determination unit 203b acquires a height $h_1$ of the white color detected first in Step S109 (see FIG. 6 described below), a height $h_2$ of the black color detected in Step S109 (see FIG. 6 described below), and a height $h_3$ of the white color detected second in Step S109 (see FIG. 6 described below) (Step S112 illustrated in FIG. 5B).

Next, the second determination unit 203b acquires a Y coordinate $Y_{n+1}$ representing the center of the height $h_2$ and a Y coordinate $Y_{n+2}$ representing the center of the height $h_3$ (Step S113 illustrated in FIG. 5B).

Next, the third scanning unit 202c scans the image captured by the imaging unit 23 for coordinates $(X_{m+1}, Y_{n+1})$ to coordinates $(X_{m+2}, Y_{n+1})$, coordinates $(X_{m+2}, Y_{n+1})$ to coordinates $(X_{m+3}, Y_{n+1})$, coordinates $(X_{m+1}, Y_{n+2})$ to coordinates $(X_{m+2}, Y_{n+2})$, and coordinates $(X_{m+2}, Y_{n+2})$ to coordinates $(X_{m+3}, Y_{n+2})$ in the positive direction of the X axis, and the third determination unit 203c determines whether each of such cells has the white color or the black color (Step S114 illustrated in FIG. 5B).

Here, a cell from the coordinates $(X_{m+1}, Y_{n+1})$ to the coordinates $(X_{m+2}, Y_{n+1})$ corresponds to the reflective cell C22 and thus is determined as the white color.

In addition, a cell from the coordinates $(X_{m+2}, Y_{n+1})$ to the coordinates $(X_{m+3}, Y_{n+1})$ corresponds to a light absorption cell C23 and thus is determined as the black color.

Furthermore, a cell from the coordinates $(X_{m+1}, Y_{n+2})$ to the coordinates $(X_{m+2}, Y_{n+2})$ corresponds to the light absorption cell C32 and thus is determined as the black color.

In addition, a cell from the coordinates $(X_{m+2}, Y_{n+2})$ to the coordinates $(X_{m+3}, Y_{n+2})$ corresponds to the reflective cell C33 and thus is determined as the white color.

Next, the third determination unit 203c reads a binary code acquired in a case in which each cell determined as the white color is set to 1, and each cell determined as the black color is set to 0 on the basis of the scanning result acquired in Step S114 and transforms the read binary code into a decimal number (Step S115 illustrated in FIG. 5B).

Here, the reflective cell C22, the light absorption cell C23, the light absorption cell C32, and the reflective cell C33 scanned in Step S114 are respectively determined as the white color, the black color, the black color, and the white color in Step S114. Thus, in Step S115, 1001 is read as the binary code and is transformed into 9 ($=2^3 \times 1 + 2^2 \times 0 + 2^1 \times 0 + 2^0 \times 1$) as a decimal number.

Next, the third determination unit 203c determines whether or not a marker ID corresponding to the decimal number transformed in Step S115 is present in a table (FIG. 3) stored in the storage unit 205a (Step S116 illustrated in FIG. 5B).

In a case in which the third determination unit 203c determines that a marker ID corresponding to the transformed decimal number is not present (No in Step S116 illustrated in FIG. 5B), the process of Step S117 is performed.

In other words, the third determination unit 203c adds 1 to the variable n (Step S117 illustrated in FIG. 5B) and performs the process of Step S102 described above again.

On the other hand, in a case in which the third determination unit 203c determines that a marker ID corresponding to the transformed decimal number is present (Yes in Step S116 illustrated in FIG. 5B), the process of Step S118 is performed.

In other words, the acquisition unit 204 acquires control information associated with the marker ID corresponding to the decimal number transformed in Step S115 by reading the control information from the storage unit 205a (Step S118 illustrated in FIG. 5B).

Here, since the decimal number acquired through the transformation in S115 is 9, the acquisition unit 204 acquires information of a predetermined operation, a marker distance, and a rotation angle illustrated in FIG. 3 that is control information corresponding to the marker ID of which the value is 9.

Next, the third determination unit 203c acquires center of gravity coordinates of the detected marker (Step S119 illustrated in FIG. 5B). For example, the third determination unit 203c acquires an X coordinate of the center of gravity of the marker 30a using an equation "$(X_m + X_{m+3})/2$", and $Y_{n+1}$ is used as a Y coordinate of the center of the marker 30a. Here, the sign "/" represents an operator of division.

Next, the drive unit 27 controls operations (translation and turning) of the mobile body 20 on the basis of the control information acquired in Step S118 (Step S120 illustrated in FIG. 5B).

After the drive unit 27 performs the control of Step S120, the process of Step S101 described above is performed.

FIG. 6 is a diagram illustrating a process performed using the image processing unit 201a according to the first embodiment of the present invention.

FIG. 6 illustrates an example of an image 50a captured by the imaging unit 23. In the image 50a, an image corresponding to cells of a matrix shape of 3 rows×3 columns corresponding to the marker 30a (FIG. 3) is included. The horizontal direction of FIG. 6 represents the X axis direction, and a vertical direction of FIG. 6 represents the Y axis direction. Coordinates (X, Y) of an upper end and a left end of the image 50a are $(X_0, Y_0)$.

In a process of Step S102 illustrated in FIG. 5A, the first scanning unit 202a performs scanning P11 for an area of the image 50a of which the Y coordinate illustrated in FIG. 6 is $Y_n$ and which is an area (also referred to as a first area) set by an area $A_1$ and an area $B_{11}$ from the left side of the image 50a to the right side thereof.

In a process of Step S106 illustrated in FIG. 5A, X coordinates $X_m$, $X_{m+1}$, $X_{m+2}$, and $X_{m+3}$ that are boundary positions of the pattern of the white color, the black color, and the white color detected in Step S103 and are boundary positions illustrated in FIG. 6 are acquired by the first determination unit 203a.

In addition, by calculating a difference between the X coordinate $X_m$ and the X coordinate $X_{m+1}$, a width $w_1$ of the white pattern corresponding to the reflective cell C11 is acquired. Furthermore, by calculating a difference between the X coordinate $X_{m+1}$ and the X coordinate $X_{m+2}$, a width $w_2$ of the black pattern corresponding to the light absorption cell C12 is acquired. In addition, by calculating a difference between the X coordinate $X_{m+2}$ and the X coordinate $X_{m+3}$, a width $w_3$ of the white pattern corresponding to the reflective cell C13 is acquired.

Furthermore, in a process of Step S107 illustrated in FIG. 5A, by acquiring a value of a half of the difference between the X coordinate $X_m$ and the X coordinate $X_{m+1}$ using the first determination unit 203a, an X coordinate $X_S$ representing the center of the width $w_1$ is acquired.

In a process of Step S108 illustrated in FIG. 5A, the second scanning unit 202b performs scanning P12 for an area of the image 50a of which the X coordinate illustrated in FIG. 6 is $X_S$ and which is an area (also referred to as a second area) set by an area A11 and an area B1 from the upper side of the image 50a to the lower side thereof.

In the process of Step S112 illustrated in FIG. 5B, by using the second determination unit 203b, on the basis of the boundary positions of the pattern of the white color, the black color, and the white color detected in Step S108, a height $h_1$ of the white pattern corresponding to the reflective cell C11 is acquired, a height $h_2$ of the black pattern corresponding to the light absorption cell C21 is acquired, and a height $h_3$ of the white pattern corresponding to the reflective cell C31 is acquired.

In a process of Step S114 illustrated in FIG. 5B, the third scanning unit 202c performs scanning P13 and P14 for an area of the image 50a of which the Y coordinates illustrated in FIG. 6 are $Y_{n+1}$ and $Y_{n+2}$ and which is an area (also referred to as a third area) set by an area $A_{12}$ and an area $B_{12}$ from the left side of the image 50a to the right side thereof.

FIG. 7 is a diagram illustrating an example of an operation of the mobile body 20 according to the first embodiment of the present invention.

FIG. 7 illustrates a schematic plan view of a factory in which a passage 100 is provided. In the first embodiment, by imaging markers 31, 32, 33, 34, and 35 using the imaging unit 23, the mobile body 20 performs unmanned conveyance of the package 25 from a departure position R1 to a target position R6. Similar to the marker 30a, each of the markers 31, 32, 33, 34, and 35 includes a plurality of pieces of first information and a plurality of pieces of second information (in other words, a plurality of reflective cells and a plurality of light absorption cells).

In FIG. 7, although the markers 31, 32, 33, 34, and 35 are represented in a plane, such markers 31, 32, 33, 34, and 35 are attached to walls and ceilings facing the passage 100.

First, a package 25 is loaded on a cargo bed of the mobile body 20 in the mobile body 20 located at the departure position R1 by an employee or the like working at the factory.

Next, the imaging unit 23 of the mobile body 20 reads the marker 31. The image processing unit 201a of the mobile body 20 identifies that the marker ID of the marker 31 is 0 by performing the process of the flowchart illustrated in FIGS. 5A and 5B and acquires control information that is control information of a case in which the marker ID is 0 and is stored in the storage unit 205a of the mobile body 20. The drive unit 27 of the mobile body 20 performs a process M1 of translating the mobile body 20 from the departure position R1 and then moving the mobile body 20 to a position R2 at which the mobile body 20 can read the next marker 32 on the basis of the acquired control information.

Next, the imaging unit 23 of the mobile body 20 reads the marker 32. The image processing unit 201a of the mobile body 20 identifies that the marker ID of the marker 32 is 3 by performing the process of the flowchart illustrated in FIGS. 5A and 5B and acquires control information that is control information of a case in which the marker ID is 3 and is stored in the storage unit 205a of the mobile body 20. The drive unit 27 of the mobile body 20 performs a process M2 of turning the mobile body 20 to the right by 90 degrees at the position R2 and moving the mobile body 20 to a position R3 at which the mobile body 20 can read the next marker 33 on the basis of the acquired control information.

Next, the imaging unit 23 of the mobile body 20 reads the marker 33. The image processing unit 201a of the mobile body 20 identifies that the marker ID of the marker 33 is 0 by performing the process of the flowchart illustrated in FIGS. 5A and 5B and acquires control information that is control information of a case in which the marker ID is 0 and is stored in the storage unit 205a of the mobile body 20. The drive unit 27 of the mobile body 20 performs a process M3 of translating the mobile body 20 from the position R3 and then moving the mobile body 20 to a position R4 at which the mobile body 20 can read the next marker 34 on the basis of the acquired control information.

Next, the imaging unit 23 of the mobile body 20 reads the marker 34. The image processing unit 201a of the mobile body 20 identifies that the marker ID of the marker 34 is 4 by performing the process of the flowchart illustrated in FIGS. 5A and 5B and acquires control information that is control information of a case in which the marker ID is 4 and is stored in the storage unit 205*a* of the mobile body 20. The drive unit 27 of the mobile body 20 performs a process M4 of turning the mobile body 20 to the left by 90 degrees at the position R4 and moving the mobile body 20 to a position R5 at which the mobile body 20 can read the next marker 35 on the basis of the acquired control information.

Next, the imaging unit 23 of the mobile body 20 reads the marker 35. The image processing unit 201*a* of the mobile body 20 identifies that the marker ID of the marker 35 is 1 by performing the process of the flowchart illustrated in FIGS. 5A and 5B and acquires control information that is control information of a case in which the marker ID is 1 and is stored in the storage unit 205*a* of the mobile body 20. The drive unit 27 of the mobile body 20 performs a process M5 of turning the mobile body 20 to the right by 180 degrees at the position R5 and moving the mobile body 20 to the target position R6 on the basis of the acquired control information.

In accordance with the process described with reference to FIG. 7, an employ working at the factory does not need to convey the package 25 from the departure position R1 to the target position R6 by himself or herself and can perform unmanned conveyance of the package 25 from the departure position R1 to the target position R6 using the mobile body 20.

In addition, even when a global positioning system (GPS) is not mounted in the mobile body 20, the mobile body 20 images markers using the imaging unit 23 and moves inside the factory. Thus, in a situation in which the status of electric waves is bad, and electric waves of the GPS cannot be received, the mobile body 20 can be caused to convey the package 25.

Figure 8:
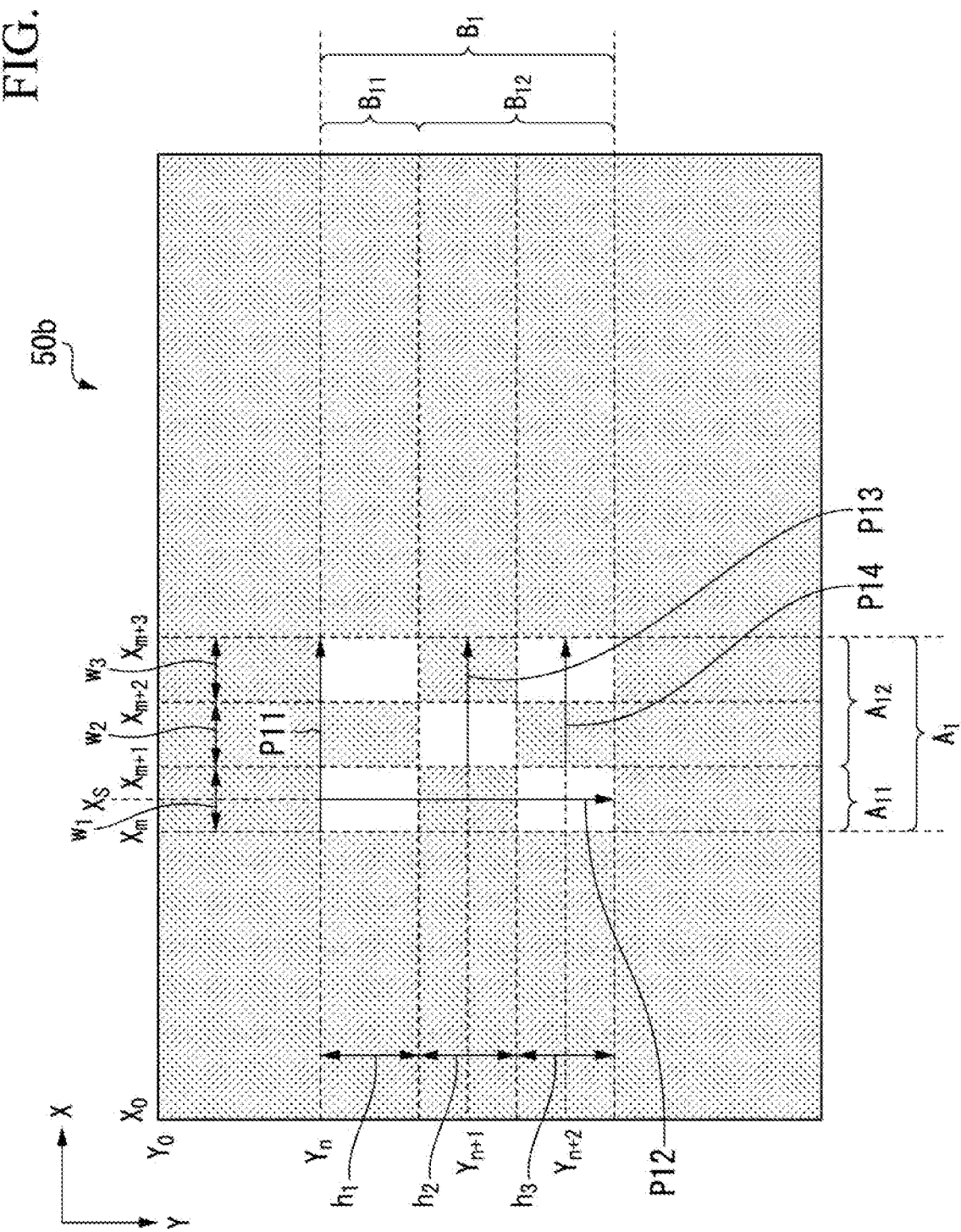
FIG. 8 is a diagram illustrating a first effect according to the first embodiment of the present invention.

FIG. 8 is a diagram illustrating a first effect according to the first embodiment of the present invention.

In FIG. 6 described above, the image 50*a* that is captured in a case in which the marker 30*a* is present in front of the imaging unit 23 of the mobile body 20 has been described.

However, for example, in a case in which an angle formed between the traveling direction of the mobile body 20 and a line joining the imaging unit 23 of the mobile body 20 and the marker 30*a* attached to a wall on a left side of the passage 100 when seen from the mobile body 20 is 60 degrees, an image captured by the imaging unit 23 is like an image 50*b* illustrated in FIG. 8. In other words, in the image 50*b* illustrated in FIG. 8, a width of the marker 30*a* in the X axis direction is imaged shorter than that of the image 50*a* illustrated in FIG. 6.

However, even in a case in which the image 50*b* illustrated in FIG. 8 is captured, by performing the process of the flowchart illustrated in FIGS. 5A and 5B, like in a case in which the image 50*a* illustrated in FIG. 6 is captured, scanning P11 using the first scanning unit 202*a*, scanning P12 using the second scanning unit 202*b*, and scanning P13 and P14 using the third scanning unit 202*c* can be performed, and control information associated with the marker 30*a* can be read.

Figure 9:
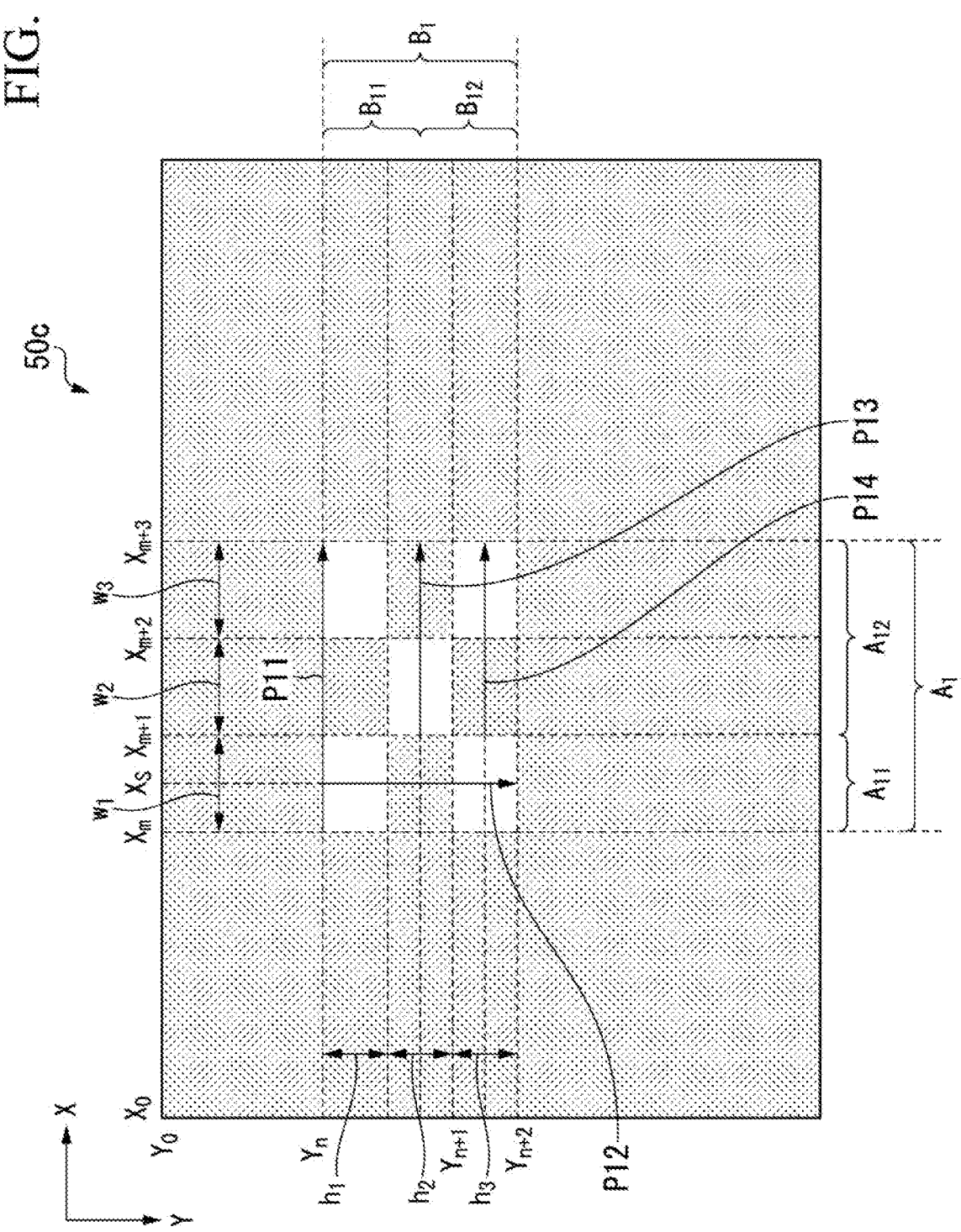
FIG. 9 is a diagram illustrating a second effect according to the first embodiment of the present invention.

FIG. 9 is a diagram illustrating a second effect according to the first embodiment of the present invention. In FIG. 8, the case in which the marker 30*a* is attached to the wall on the left side of the passage 100 when seen from the mobile body 20 has been described. However, in FIG. 9, a case in which the marker 30*a* is attached to a ceiling in front of the passage 100 when seen from the mobile body 20 will be described.

For example, in a case in which an angle formed between the traveling direction of the mobile body 20 and a line joining the imaging unit 23 of the mobile body 20 and the marker 30*a* attached to a ceiling in front of the passage 100 when seen from the mobile body 20 is 45 degrees, an image captured by the imaging unit 23 is like an image 50*c* illustrated in FIG. 9. In other words, in the image 50*c* illustrated in FIG. 9, a height of the marker 30*a* in the Y axis direction is imaged shorter than that of the image 50*a* illustrated in FIG. 6.

However, even in a case in which the image 50*c* illustrated in FIG. 9 is captured, by performing the process of the flowchart illustrated in FIGS. 5A and 5B, like in a case in which the image 50*a* illustrated in FIG. 6 is captured, scanning P11 using the first scanning unit 202*a*, scanning P12 using the second scanning unit 202*b*, and scanning P13 and P14 using the third scanning unit 202*c* can be performed, and control information associated with the marker 30*a* can be read.

In the first embodiment, the first scanning unit 202*a* scans a first area (an area set by the area $A_1$ and the area $B_{11}$ illustrated in FIG. 6) of the image 50*a* acquired on the basis of reflective light of infrared light L1 emitted to the outside of the mobile body 20 in the horizontal direction (a first direction) (scanning P11 illustrated in FIG. 6). In addition, the first determination unit 203*a* determines whether or not the first condition is satisfied on the basis of the first scanning result acquired by the first scanning unit 202*a* (Step S103 illustrated in FIG. 5A). In addition, in a case in which the first determination unit 203*a* determines that the first condition is satisfied, the second scanning unit 202*b* scans a second area (an area set by the area $A_{11}$ and the area $B_1$ illustrated in FIG. 6) of the image 50*a* in a vertical direction (a second direction) different from the horizontal direction (the first direction) (the scanning P12 illustrated in FIG. 6). In addition, the second determination unit 203*b* determines whether or not the second condition is satisfied on the basis of the second scanning result acquired by the second scanning unit 202*b* (Step S109 illustrated in FIG. 5A). In addition, after the second determination unit 203*b* determines that the second condition is satisfied, the third scanning unit 202*c* scans a third area (an area set by the area $A_{12}$ and the area $B_{12}$ illustrated in FIG. 6) of the image 50*a* (the scanning P13 and P14 illustrated in FIG. 6). In addition, the third determination unit 203*c* determines whether or not predetermined information (information formed from the white color or the black color) is included in the third area scanned by the third scanning unit 202*c*.

In this way, in accordance with a relation of an angle with which the marker 30*a* is imaged from the mobile body 20, even in a case in which the captured image 50*b* is captured short in the X axis direction (see FIG. 8), or in a case in which the captured image 50*c* is captured short in the Y axis direction (see FIG. 9), corrected images acquired by the mobile body 20 imaging the marker 30*a* in front do not need to be generated from such images 50*b* and 50*c*. Thus, the speed of image processing using the image processing unit 201*a* can be improved.

In addition, in the first embodiment, in a case in which the reflective cell C11 (first information), the light absorption cell C12 (second information), and the reflective cell C13 (first information) are sequentially detected in the first scanning result, and the widths w1, w2, and w3 of areas in which the reflective cell C11, the first light absorption cell C12, and the second reflective cell C13 are detected are approximately the same as a predetermined width (for example, $w_1 \times 0.9 < w_2 < w_1 \times 1.1$, and $w_1 \times 0.9 < w_3 < w_1 \times 1.1$ are satisfied), the first determination unit 203a determines that the first condition is satisfied. In other words, the widths $w_1$, $w_2$, and $w_3$ being approximately the same as a predetermined width, for example, is a ratio of the width $w_2$ to the width $w_1$ and a ratio of the width $w_3$ to the width $w_1$ being within a first predetermined range (for example, being larger than 0.9 and smaller than 1.1).

In accordance with this, the detection accuracy of the marker 30a including the reflective cell C11, the light absorption cell C12, and the reflective cell C13 can be improved. For example, in a case in which a small black stain is attached to a center part of the reflective cell C11, a width of the small black stain in the horizontal direction is smaller than the width of a white area on each of both sides in the horizontal direction. In accordance with the configuration described above, the reflective cell C11 to which a small black stain is attached can be prevented from being recognized as a start bar.

In addition, in the first embodiment, in a case in which the reflective cell C11 (first information), the light absorption cell C21 (second information), and the reflective cell C31 (first information) are sequentially detected in the second scanning result, the second determination unit 203b determines that the second condition is satisfied.

In a case in which the marker 30a is detected by performing scanning twice in the horizontal direction (the first direction), there is a possibility of the position of the second scanning in the Y axis direction deviating from the position of the reflective cell C31 and not being able to correctly detect the marker 30a. However, according to the first embodiment, the marker 30a is detected by performing scanning in the horizontal direction (the first direction) of the image 50a and thereafter performing scanning in the vertical direction (the second direction) different from the horizontal direction, and thus the marker 30a can be correctly detected.

In addition, in the first embodiment, the second determination unit 203b uses one of reflective cells (the first information) detected by the first scanning unit 202a as a reflective cell (the first information) that is detected first by the second determination unit 203b.

For example, in a case in which the marker 30a formed from a cell of 3 rows×3 columns is used and in a case in which any one of the reflective cell C11 and the reflective cell C13 is not commonly used for scanning using the first scanning unit 202a and scanning using the second scanning unit 202b, three cells are used for the scanning using the first scanning unit 202a, and other three cells are used for the scanning using the second scanning unit 202b. Thus, as cells for identifying control information used for controlling the operation of the mobile body 20, only the remaining three cells can be used, only control information of $2^3=8$ kinds can be used.

However, in the first embodiment, the reflective cell C11 is commonly used for scanning using the first scanning unit 202a and scanning using the second scanning unit 202b. In this case, a total of five cells are used for the scanning using the first scanning unit 202a and the scanning using the second scanning unit 202b, and thus, as cells used for identifying control information used for controlling the operation of the mobile body 20, the remaining four cells can be used, and control information of $2^4=16$ kinds can be used.

In addition, the second determination unit 203b may use not the reflective cell C11 but the reflective cell C13 out of reflective cells scanned by the first scanning unit 202a (detected by the first scanning unit 202a) in the horizontal direction as a reflective cell scanned by the second scanning unit 202b in the vertical direction.

In addition, in the first embodiment, in a case in which the third determination unit 203c determines that predetermined information is included in the third area, the acquisition unit 204 acquires control information (see FIG. 3) used for controlling the operation of the mobile body 20.

In accordance with this, in a case in which the first condition (Step S103 illustrated in FIG. 5A) is satisfied, the second condition (Step S109 illustrated in FIG. 5A) is satisfied, and it is determined that predetermined information is included in the third area (an area set by the area A12 and the area B12 illustrated in FIG. 6), the control information used for controlling the operation of the mobile body 20 is acquired by the acquisition unit 204. Thus, the detection accuracy of the control information can be improved.

In addition, in the first embodiment, the second scanning unit 202b scans the second area (an area set by the area $A_{11}$ and the area $B_1$ illustrated in FIG. 6) from the center (the X coordinate $X_S$) of the width $w_1$ of the reflective cell C11 detected in the first scanning using the first scanning unit 202a in the vertical direction (the second direction).

For example, in a case in which the second scanning unit 202b scans from a right end of the width $w_1$ of the reflective cell C11 in the vertical direction (the second direction), there is a possibility of the second scanning unit 202b incorrectly scanning an area of the light absorption cell C12 positioned on the right side. However, according to the first embodiment, the second scanning unit 202b scans the second area from the center of the width $w_1$ of the reflective cell C11 in the vertical direction, and thus even when a position scanned by the second scanning unit 202b deviates in some degree, the area inside the reflective cell C11 can be reliability scanned.

In addition, in the first embodiment, the second scanning unit 202b scans the second area (an area set by the area $A_{11}$ and the area $B_1$ illustrated in FIG. 6) using a direction orthogonal to the first direction as the second direction. In a case in which an angle formed by the first direction and the second direction is small, an area scanned by the first scanning unit 202a and an area scanned by the second scanning unit 202b are close to each other, a scanning result acquired by the first scanning unit 202a and a scanning result acquired by the second scanning unit 202b become similar to each other, and thus there is a possibility of the marker 30a not being able to be correctly detected. However, according to the first embodiment, the angle formed between the first direction and the second direction is 90 degrees, and the angle formed between the first direction and the second direction becomes a maximum. Thus, a scanning result acquired by the first scanning unit 202a and a scanning result acquired by the second scanning unit 202b can be avoided from being similar to each other, and the marker 30a can be correctly detected.

In addition, in the first embodiment, the first scanning unit 202a scans the first area (an area set by the area $A_1$ and the area $B_{11}$ illustrated in FIG. 6) using the horizontal direction as the first direction, and the second scanning unit 202b scans the second area (an area set by the area $A_{11}$ and the area $B_1$ illustrated in FIG. 6) using the vertical direction as the second direction.

There is a possibility that the mobile body 20 rotates in a yaw direction, a roll direction, and a pitch direction. In order for the mobile body 20 to convey the package 25, there is a high possibility of the passage 100 being provided such that the front wheel tire 24a and the rear wheel tire 24b on the right side of the mobile body 20 and the front wheel tire 24a and the rear wheel tire 24b on the left side are at the same height and the package 25 does not fall. In other words, the mobile body 20 has a low possibility of rolling in the roll direction among the yaw direction, the roll direction, and the pitch direction and has a low possibility of the marker 30a being imaged while inclined in the horizontal direction. According to the first embodiment, the horizontal direction in which there is a low possibility of the marker 30a being imaged while inclined is used for the scanning using the first scanning unit 202a that is a first process for detecting the marker 30a. Thus, the first scanning unit 202a can perform stable scanning, and the detection accuracy of the marker 30a can be improved.

In addition, in the first embodiment, the third scanning unit 202c scans an area other than the first area and the second area in a rectangular area including the first area and the second area as a third area (an area set by the area $A_{12}$ and the area $B_{12}$ illustrated in FIG. 6).

According to the first embodiment, the first area scanned by the first scanning unit 202a, the second area scanned by the second scanning unit 202b, and the third area scanned by the third scanning unit 202c are included in the rectangular area. For this reason, for example, the marker 30a can be formed more compact than in a case in which the third area scanned by the third scanning unit 202c is arranged outside the rectangle, and areas scanned by the first to third scanning units 202a to 202c can be narrowed. Thus, the efficiency of scanning can be improved.

In addition, in the first embodiment, by determining an order in which the white color (the first information) and the black color (the second information) are included in the third area (an area set by the area $A_{12}$ and the area $B_{12}$ illustrated in FIG. 6) scanned by the third scanning unit 202c, the third determination unit 203c described above determines whether or not a marker ID (also referred to as predetermined information) is included in the third area.

For this reason, in case in which the first determination unit 203a determines that the first condition is satisfied (Yes in Step S103 illustrated in FIG. 5A) and in a case in which the second determination unit 203b determines that the second condition is satisfied (Yes in Step S109 illustrated in FIG. 5A), in other words, in a case in which the marker 30a is detected, the third determination unit 203c can identify a marker ID associated with the marker 30a.

In addition, in the first embodiment, regarding the first information and the second information representing 0 and 1 of binary numbers used for identifying a marker ID, information acquired in accordance with light L1 emitted to the outside of the mobile body 20 being reflected by a reflective cell is used as the first information, and information acquired in accordance with the light L1 emitted to the outside of the mobile body 20 being absorbed by an absorption cell is used as the second information.

According to such a configuration, the reflectivity for reflective light acquired from a reflective cell is high, and the reflectivity for reflected light acquired from a light absorption cell is low, and thus the probability of erroneous determination of 0 and 1 of binary numbers for identifying a marker ID can be decreased.

In addition, the first scanning unit 202a, the second scanning unit 202b, and the third scanning unit 202c may be configured to scan a monochrome image as the image 50a.

In other words, by scanning a monochrome image of which the amount of information is smaller than that of a color image as the image 50a using the first to third scanning units 202a to 202c, a load required for image processing may be decreased to be lower than that of a case in which a color image is scanned, and image processing is performed thereon.

Second Embodiment

Next, a second embodiment of the present invention will be described. Description of parts in which the second embodiment takes configurations similar to those of the first embodiment and performs processes similar to those of the first embodiment will be omitted.

Figure 10:
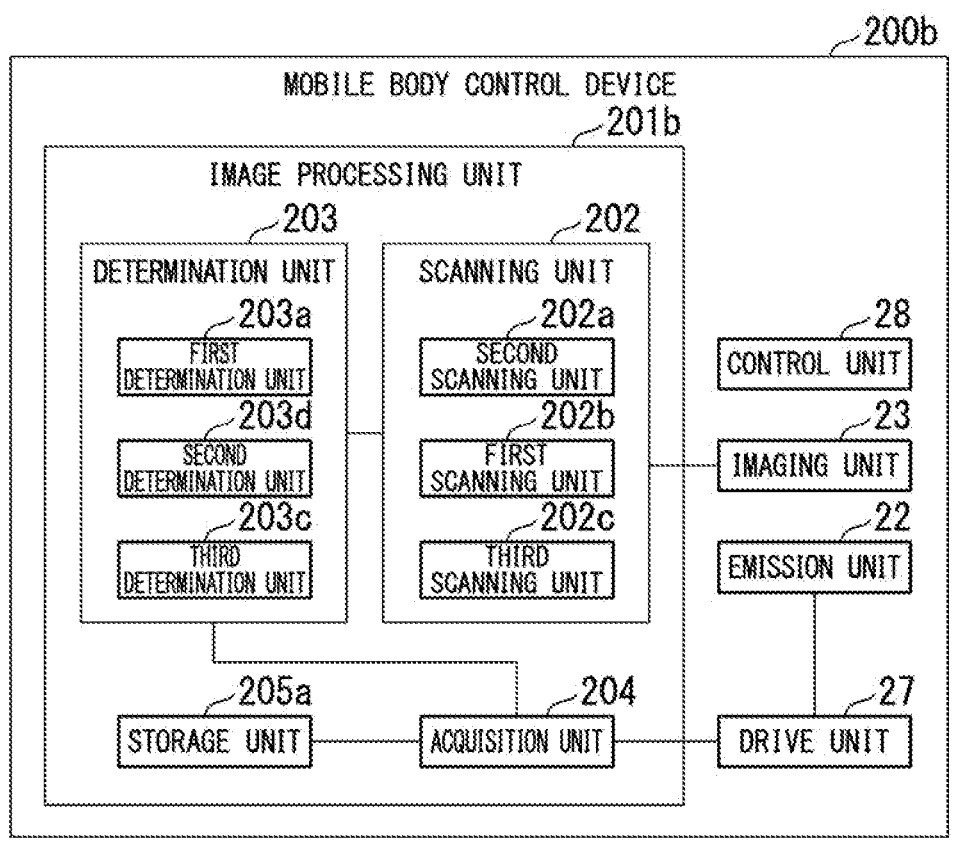
FIG. 10 is a block diagram illustrating the configuration of a mobile body control device built into a mobile body according to a second embodiment of the present invention.

FIG. 10 is a block diagram illustrating the configuration of a mobile body control device 200b built into a mobile body 20 according to the second embodiment of the present invention.

The mobile body control device 200b (FIG. 10) according to the second embodiment includes an image processing unit 201b and a second determination unit 203d instead of the image processing unit 201a and the second determination unit 203b of the mobile body control device 200a (FIG. 2) according to the first embodiment.

Figure 11A:
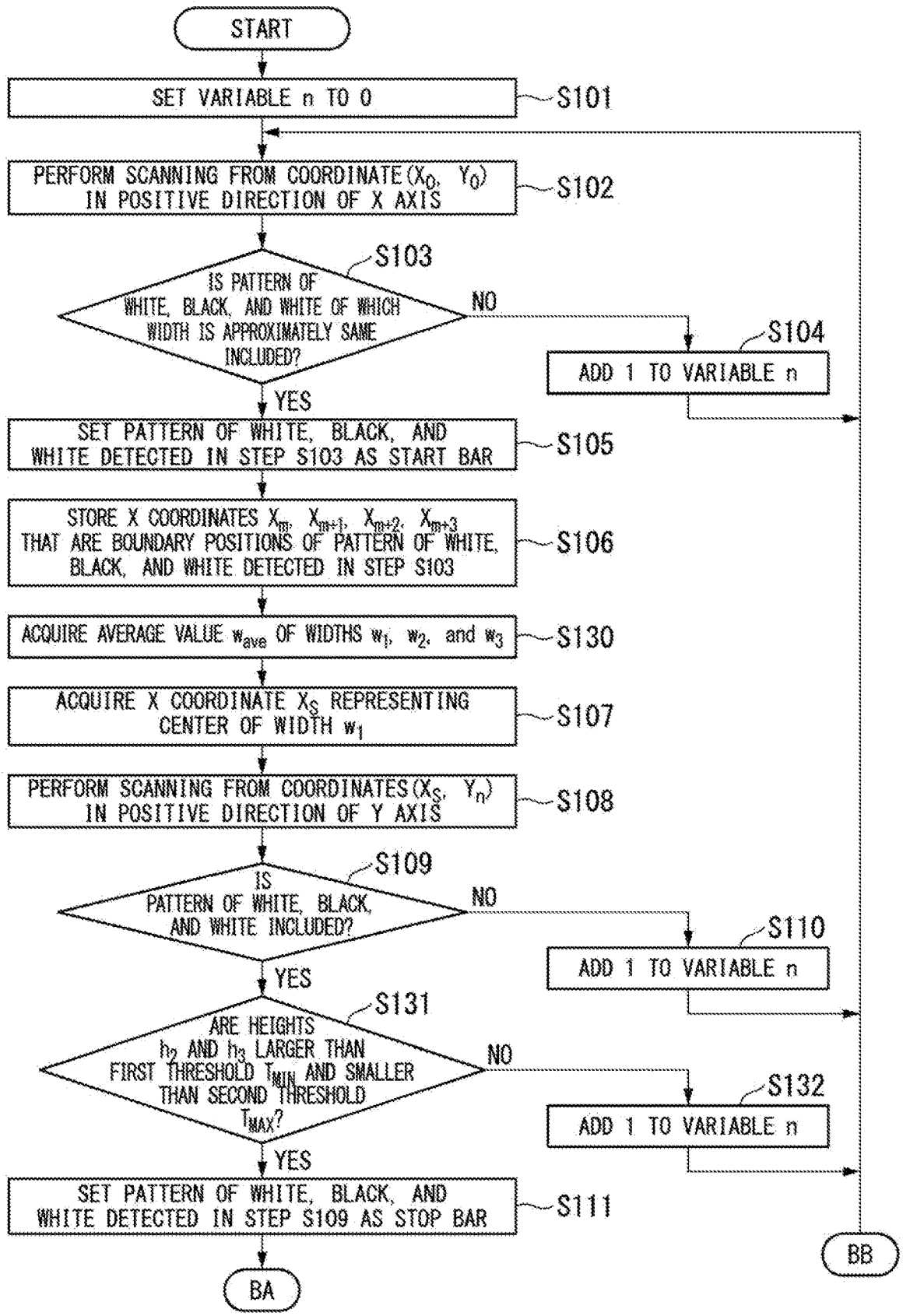
FIG. 11A is a flowchart illustrating a process of the mobile body control device according to the second embodiment of the present invention.
Figure 11B:
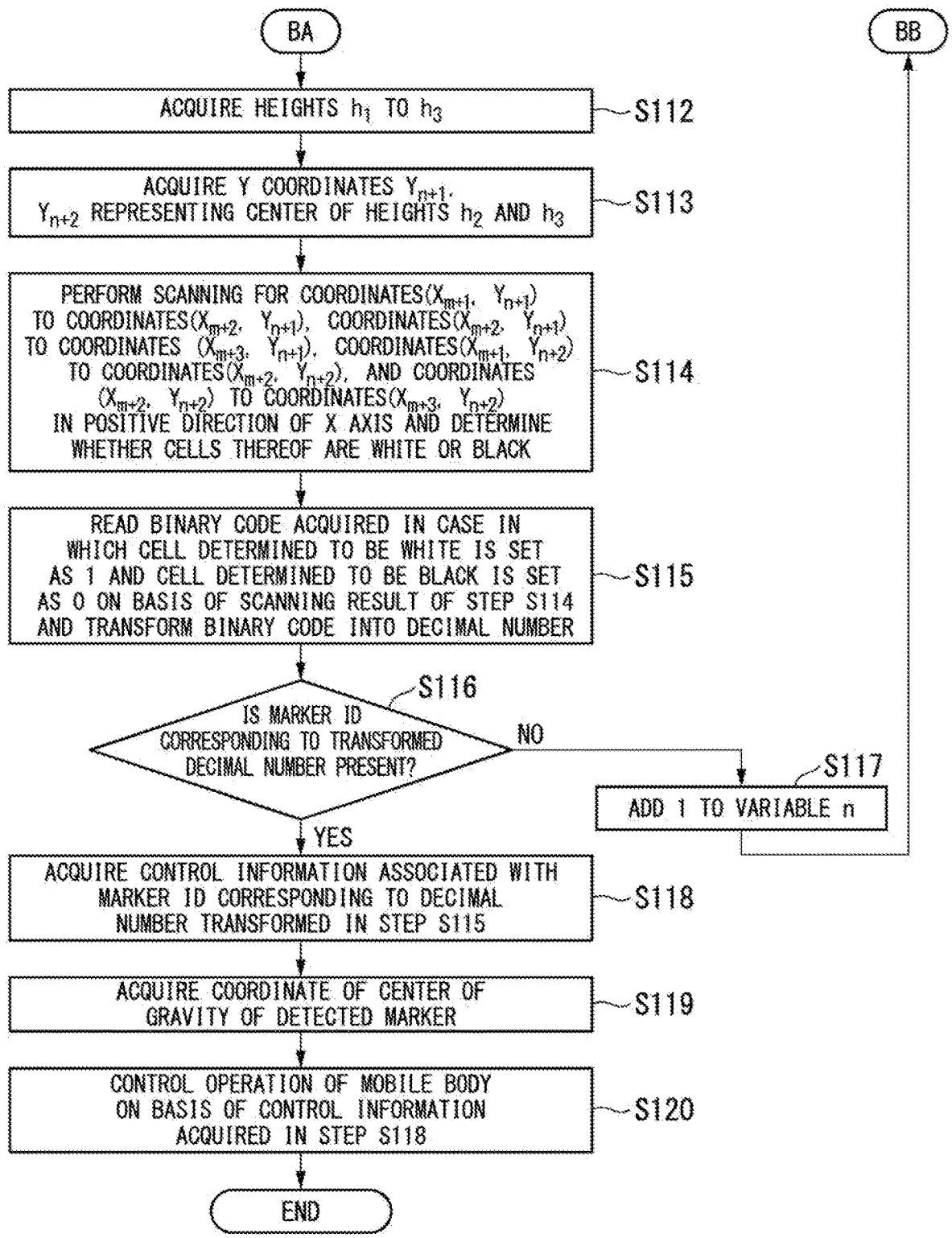
FIG. 11B is a flowchart illustrating a process of the mobile body control device according to the second embodiment of the present invention.

FIGS. 11A and 11B represent a flowchart illustrating a process of the mobile body control device 200b (FIG. 10) according to the second embodiment of the present invention. In the flowchart illustrated in FIGS. 11A and 11B according to the second embodiment, the same reference signs are assigned to parts performing processes similar to those of the flowchart according to the first embodiment illustrated in FIGS. 5A and 5B, and description of such processes will be omitted.

In the flowchart according to the first embodiment illustrated in FIGS. 5A and 5B, after the process of Step S106, the process of Step S107 is performed. On the other hand, in the flowchart according to the second embodiment illustrated in FIGS. 11A and 11B, after the process of Step S106, the process of Step S130 is performed.

In Step S106, X coordinates $X_m$, $X_{m+1}$, $X_{m+2}$, and $X_{m+3}$ that are boundary positions of a pattern of the white color, the black color, and the white color detected in Step S103 are acquired. The second determination unit 203d acquires a width $w_1$ ($=X_{m+1}-X_m$), a width $w_2$ ($=X_{m+2}-X_{m+1}$), and a width $w_3$ ($=X_{m+3}-X_{m+2}$) on the basis of the X coordinates $X_m$, $X_{m+1}$, $X_{m+2}$, and $X_{m+3}$. Then, the second determination unit 203d acquires an average value $w_{ave}$ of the width $w_1$, the width $w_2$, and the width $w_3$ using an equation $w_{ave}=(w_1+w_2+w_3)/3$ (Step S130 illustrated in FIG. 11A), and thereafter the process of Step S107 is performed.

In addition, in the flowchart according to the first embodiment illustrated in FIGS. 5A and 5B, in a case in which Yes is determined in the process of Step S109, the process of Step S111 is performed. On the other hand, in the flowchart according to the second embodiment illustrated in FIGS. 11A and 11B, in a case in which Yes is determined in the process of Step S109, the process of Step S131 is performed.

In other words, the second determination unit 203d determines whether or not heights $h_2$ and $h_3$ are larger than a first threshold $T_{MIN}$ and smaller than a second threshold $T_{MAX}$ (Step S131 illustrated in FIG. 11A).

Here, as the first threshold $T_{MIN}$, for example, a value $T_{MIN}=w_{ave}\times0.7$ or the like is used. As the second threshold $T_{MAX}$, for example, a value $T_{MAX}=w_{ave}\times1.3$ is used. In order to improve the detection accuracy of the marker 30a, a value $T_{MIN}=w_{ave}\times0.8$ may be used, and, as the second threshold $T_{MAX}$, for example, a value $T_{MAX}=w_{ave}\times1.2$ may be used.

In addition, as the first threshold $T_{MIN}$, for example, a value $T_{MIN}=h_1\times0.7$ may be used, and, as the second threshold $T_{MAX}$, for example, a value $T_{MAX}=h_1\times1.3$ may be used.

Furthermore, in order to improve the detection accuracy of the marker 30a, a value $T_{MIN}=h_1 \times 0.8$ may be used, and, as the second threshold $T_{MAX}$, for example, a value $T_{MAX}=h_1 \times 1.2$ may be used.

In a case in which the second determination unit 203d determines that the height $h_2$ or $h_3$ is equal to or smaller than the first threshold $T_{MIN}$ or equal to or larger than the second threshold $T_{MAX}$ (No in Step S131 illustrated in FIG. 11A), the process of Step S132 is performed.

In other words, the first scanning unit 202a adds 1 to the variable n (Step S132 illustrated in FIG. 11A), and thereafter the process of Step S102 is performed.

On the other hand, in a case in which the second determination unit 203d determines that the heights $h_2$ and $h_3$ are larger than the first threshold $T_{MIN}$ and smaller than the second threshold $T_{MAX}$ (Yes in Step S131 illustrated in FIG. 11A), the process of Step S111 is performed.

In the second embodiment, in a case in which a reflective cell C11 (first information), a light absorption cell C21 (second information), and a reflective cell C31 (the first information) are sequentially detected in a second scanning result, and heights $h_2$ and $h_3$ of the light absorption cell C21 and the reflective cell C31 are approximately the same as a second predetermined height (for example, conditions of $w_{ave} \times 0.7 < h_2 < w_{ave} \times 1.3$ and $w_{ave} \times 0.7 < h_3 < w_{ave} \times 1.3$ are satisfied), the second determination unit 203d determines that a second condition (the condition of Step S131 illustrated in FIG. 11A) is satisfied. In other words, the heights $h_2$ and $h_3$ being approximately the same as a predetermined height, for example, is a ratio of the height $h_2$ to the average value $w_{ave}$ of the widths $w_1$, $w_2$, and $w_3$ and a ratio of the height $h_3$ to the average value $w_{ave}$ of the widths $w_1$, $w_2$, and $w_3$ being within a second predetermined range (for example, larger than 0.7 and smaller than 1.3). In addition, the heights $h_2$ and $h_3$ being approximately the same as a predetermined height, for example, may be a ratio of the height $h_2$ to the height $h_1$ and a ratio of the height $h_3$ to the height $h_1$ being within a second predetermined range (for example, larger than 0.7 and smaller than 1.3).

In accordance with this, the detection accuracy of the marker 30a including the reflective cell C11, the light absorption cell C21, and the reflective cell C31 can be improved. For example, in a case in which a small black stain is attached to a center part of the reflective cell C11, a width of the small black stain in the vertical direction is smaller than a width of a white area on each of both sides in the vertical direction. In accordance with the configuration described above, the reflective cell C11 to which a small black stain is attached can be prevented from being recognized as a stop bar.

In addition, in a case in which the reflective cell C11 (first information), the light absorption cell C21 (second information), and the reflective cell C31 (the first information) are sequentially detected in the second scanning result, and heights $h_1$ to $h_3$ of the area in which such cells are detected (in other words, the reflective cell C11, the light absorption cell C21, and the reflective cell C31) are approximately the same as the second predetermined height (for example, in a case in which conditions of $w_{ave} \times 0.7 < h_1 < w_{ave} \times 1.3$, $w_{ave} \times 0.7 < h_2 < w_{ave} \times 1.3$, and $w_{ave} \times 0.7 < h_3 < w_{ave} \times 1.3$ are satisfied), the second determination unit 203d may determine that a second condition (the condition of Step S131 illustrated in FIG. 11A) is satisfied. In other words, the heights $h_1$ to $h_3$ approximately being the same as a predetermined height, for example, is the ratios of the heights $h_1$ to $h_3$ to the average value $w_{ave}$ of the widths $w_1$, $w_2$, and $w_3$ being within the second predetermined range (for example, larger than 0.7 and smaller than 1.3).

In accordance with this, the detection accuracy of the marker 30a including the reflective cell C11, the light absorption cell C21, and the reflective cell C31 can be further improved.

Third Embodiment

Next, a third embodiment of the present invention will be described. Description of parts in which the third embodiment takes configurations similar to those of the first embodiment and performs processes similar to those of the first embodiment will be omitted.

Figure 12:
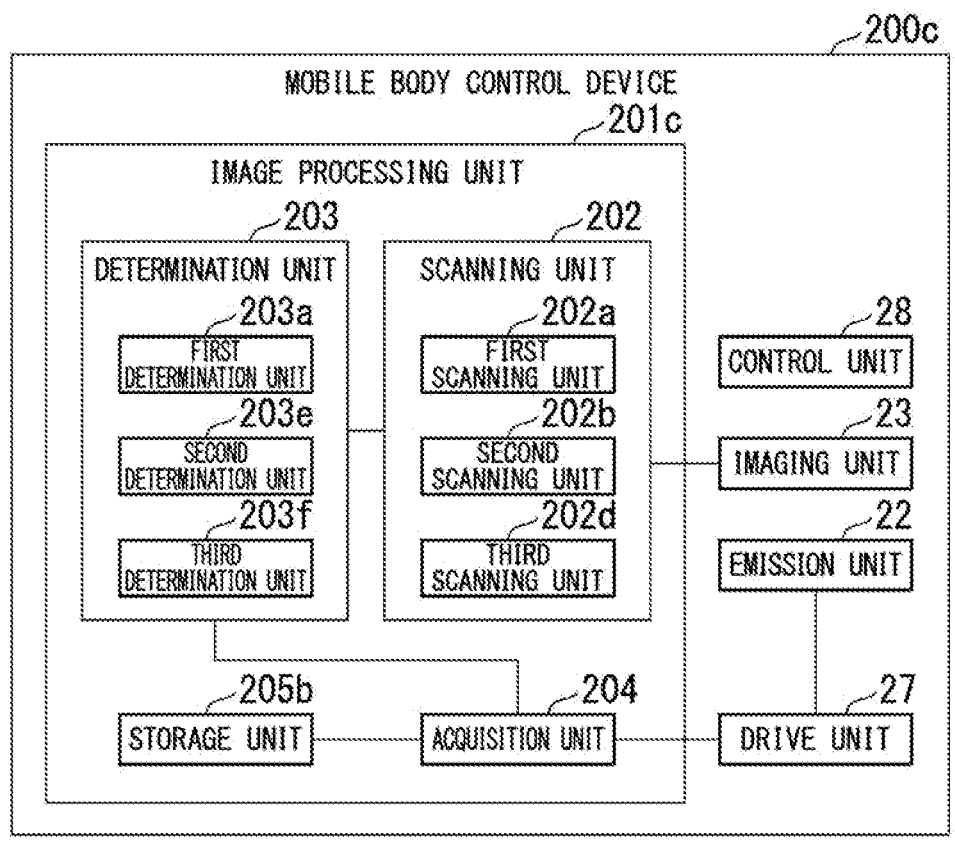
FIG. 12 is a block diagram illustrating the configuration of a mobile body control device built into a mobile body according to a third embodiment of the present invention.

FIG. 12 is a block diagram illustrating the configuration of a mobile body control device 200c built into a mobile body 20 according to the third embodiment of the present invention.

The mobile body control device 200c (FIG. 12) according to the third embodiment includes an image processing unit 201c, a third scanning unit 202d, a second determination unit 203e, a third determination unit 203f, and a storage unit 205b instead of the image processing unit 201a, the third scanning unit 202c, the second determination unit 203b, the third determination unit 203c, and the storage unit 205a of the mobile body control device 200a (FIG. 2) according to the first embodiment.

FIG. 13 is a diagram illustrating an example of information stored by a storage unit 205b (FIG. 12) according to the third embodiment of the present invention. The storage unit 205b is a storage device such as a memory.

In FIG. 13, control information of a predetermined operation (for example, stopping), a marker distance (for example, 1 m), a rotation angle (for example, 0 degrees), and the like is associated with a marker ID (for example, 0). In addition, in FIG. 13, only control information of which marker IDs are 0 to 4 is illustrated, and illustration of details of control information of which marker IDs are 5 to 255 is omitted.

In the table of FIG. 13, marker IDs of 0 to 255 are included. In other words, in the table of FIG. 13, a total of 256 marker IDs are included, and control information of 256 kinds can be set.

For example, in a case in which the acquisition unit 204 reads information of which a marker ID is 0 from the storage unit 205b and outputs the read information to the drive unit 27, the mobile body 20 is translated to a position at which a distance between the mobile body 20 and the marker is a marker distance (that is, 1 m) without rotating (in other words, a rotation angle of 0 degrees) until the next marker is read and performs a predetermined operation (that is, stopping).

Figure 14:
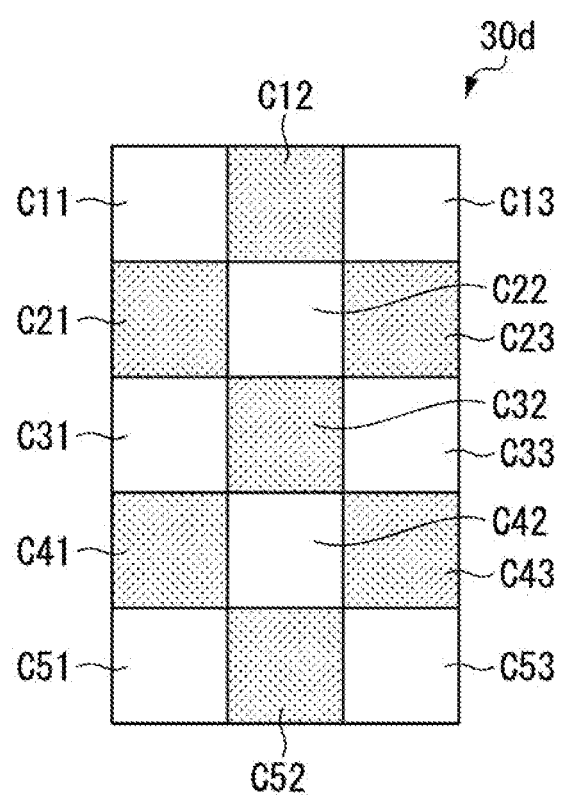
FIG. 14 is a diagram illustrating the configuration of a marker according to the third embodiment of the present invention.

FIG. 14 is a diagram illustrating the configuration of a marker 30d according to the third embodiment of the present invention.

The marker 30d is formed from a pattern of a matrix shape of 5 rows×3 columns. More specifically, the marker 30d includes a reflective cell C11 of the first row and the first column, a light absorption cell C12 of the first row and the second column, and a reflective cell C13 of the first row and the third column. In addition, the marker 30d includes a light absorption cell C21 of the second row and the first column, a reflective cell C22 of the second row and the second column, and a light absorption cell C23 of the second row and the third column. Furthermore, the marker 30d includes a reflective cell C31 of the third row and the first column, a light absorption cell C32 of the third row and the second column, and a reflective cell C33 of the third row and the third column. In addition, the marker 30d includes a light absorption cell C41 of the fourth row and the first column, a reflective cell C42 of the fourth row and the second column, and a light absorption cell C43 of the fourth row and the third column. Furthermore, the marker 30d includes a reflective cell C51 of the fifth row and the first column, a light absorption cell C52 of the fifth row and the second column, and a reflective cell C53 of the fifth row and the third column.

In addition, the reflective cells C11, C13, C22, C31, C33, C42, C51, and C53 are formed using a material having high light reflectivity. Furthermore, the light absorption cells C12, C21, C23, C32, C41, C43, and C52 are formed using a material having low light reflectivity.

Figure 15A:
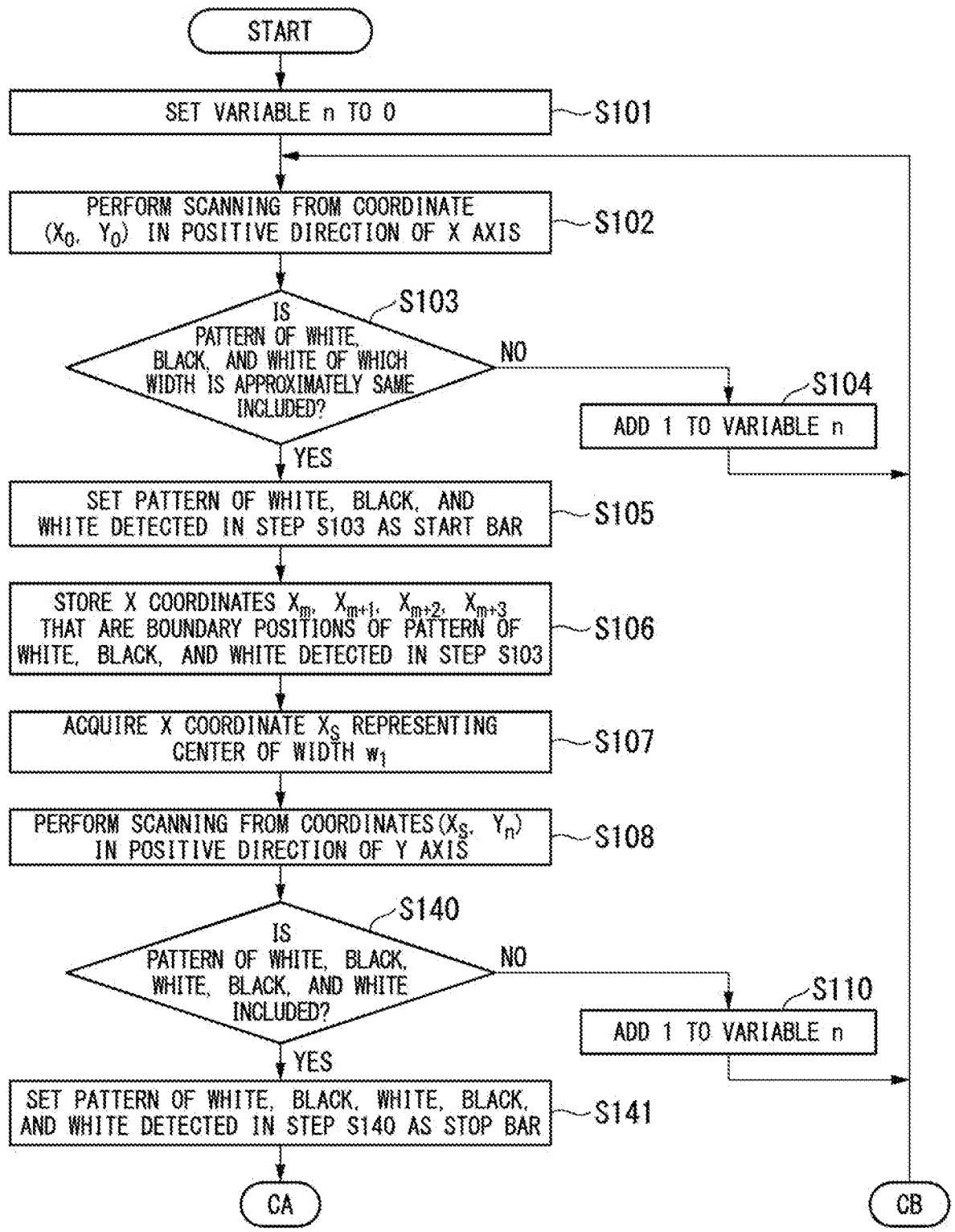
FIG. 15A is a flowchart illustrating a process of the mobile body control device according to the third embodiment of the present invention.
Figure 15B:
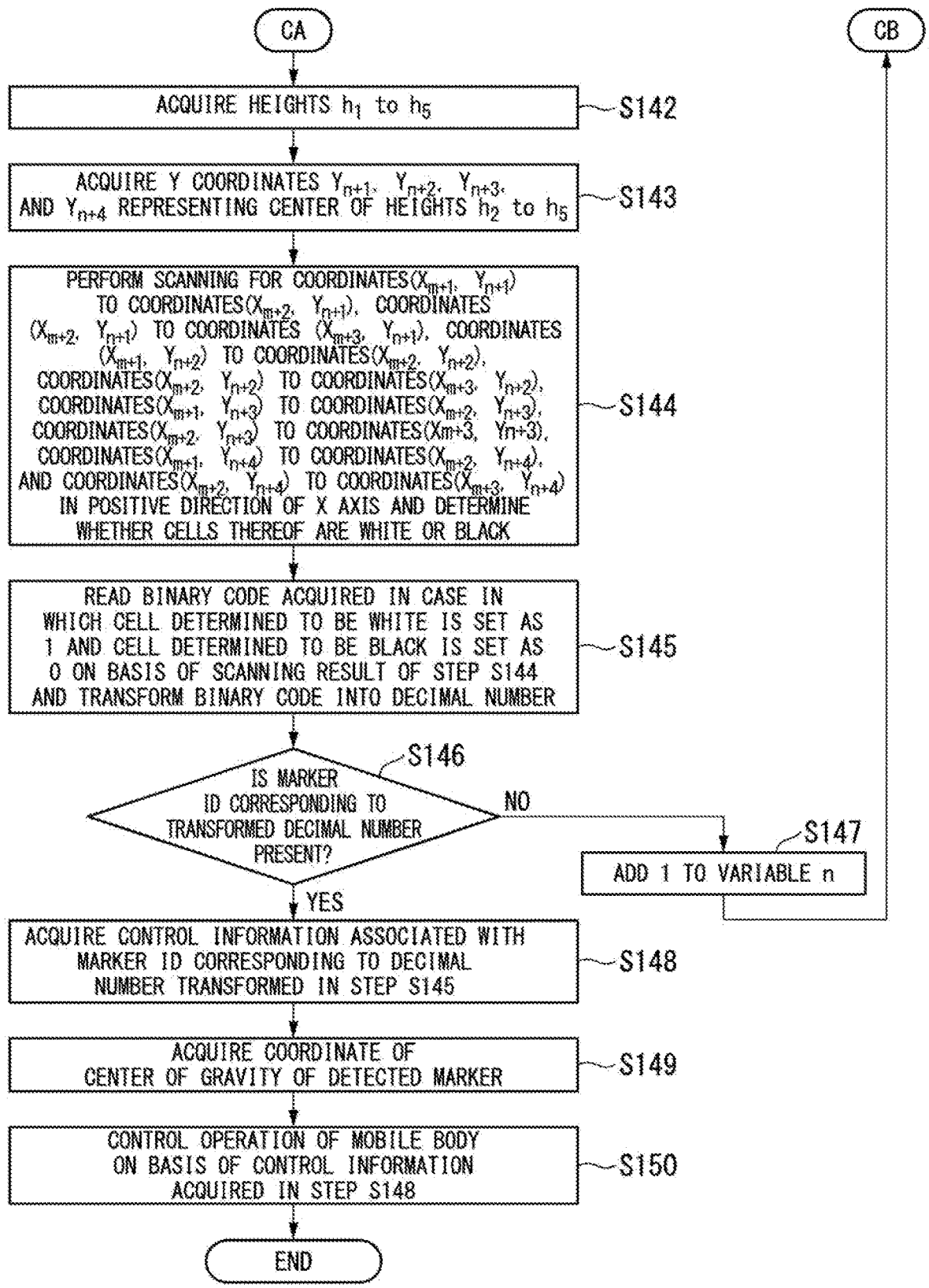
FIG. 15B is a flowchart illustrating a process of the mobile body control device according to the third embodiment of the present invention.

FIGS. 15A and 15B represent a flowchart illustrating a process of the mobile body control device 200c (FIG. 12) according to the third embodiment of the present invention. In the flowchart according to the third embodiment illustrated in FIGS. 15A and 15B, the same reference signs are assigned to parts performing processes similar to those of the flowchart according to the first embodiment illustrated in FIGS. 5A and 5B, and description of such processes will be omitted.

In the flowchart according to the first embodiment illustrated in FIGS. 5A and 5B, after the process of Step S108, in Step S109, the second determination unit 203b determines whether or not the pattern of the white color, the black color, and the white color is included in the scanning result acquired by the second scanning unit 202b in Step S108. However, in the flowchart according to the third embodiment illustrated in FIGS. 15A and 15B, after the process of Step S108, the process of Step S140 is performed instead of Step S109.

In other words, the second determination unit 203e determines whether or not a pattern of a white color, a black color, a white color, a black color, and a white color is included in a scanning result acquired by the second scanning unit 202b in Step S108 (Step S140 illustrated in FIG. 15A).

In a case in which the second determination unit 203e determines that the pattern of the white color, the black color, the white color, the black color, and the white color is not included (No in Step S140 illustrated in FIG. 15A), the process of Step S110 is performed. On the other hand, in a case in which the second determination unit 203e determines that the pattern of the white color, the black color, the white color, the black color, and the white color is included (Yes in Step S140 illustrated in FIG. 15A), the process of Step S141 is performed. In other words, the second determination unit 203e regards the pattern of the white color, the black color, the white color, the black color, and the white color detected in Step S140 as the reflective cell C11, the light absorption cell C21, the reflective cell C31, the light absorption cell C41, and the reflective cell C51 of the marker 30d (FIG. 14) and sets the pattern of the white color, the black color, the white color, the black color, and the white color detected in Step S140 as a stop bar (Step S141 illustrated in FIG. 15A).

Next, the second determination unit 203e acquires a height $h_1$ of the white color detected first in Step S140 (see FIG. 16 described below), a height $h_2$ of the black color detected first in Step S140 (see FIG. 16 described below), a height $h_3$ of the white color detected second in Step S140 (see FIG. 16 described below), a height $h_4$ of the black color detected second in Step S140 (see FIG. 16 described below), and a height $h_5$ of the white color detected third in Step S140 (see FIG. 16 described below) (Step S142 illustrated in FIG. 15B).

Next, the second determination unit 203e acquires a Y coordinate $Y_{n+1}$ representing the center of the height $h_2$, a Y coordinate $Y_{n+2}$ representing the center of the height $h_3$, a Y coordinate $Y_{n+3}$ representing the center of the height $h_4$, a Y coordinate $Y_{n+4}$ representing the center of the height $h_5$ (Step S143 illustrated in FIG. 15B).

Next, the third scanning unit 202d scans an image captured by the imaging unit 23 in the positive direction of the X axis for coordinates $(X_{m+1}, Y_{n+1})$ to coordinates $(X_{m+2}, Y_{n+1})$, coordinates $(X_{m+2}, Y_{n+1})$ to coordinates $(X_{m+3}, Y_{n+1})$, coordinates $(X_{m+1}, Y_{n+2})$ to coordinates $(X_{m+2}, Y_{n+2})$, coordinates $(X_{m+2}, Y_{n+2})$ to coordinates $(X_{m+3}, Y_{n+2})$, coordinates $(X_{m+1}, Y_{n+3})$ to coordinates $(X_{m+2}, Y_{n+3})$, coordinates $(X_{m+2}, Y_{n+3})$ to coordinates $(X_{m+3}, Y_{n+3})$, coordinates $(X_{m+1}, Y_{n+4})$ to coordinates $(X_{m+2}, Y_{n+4})$, and coordinates $(X_{m+2}, Y_{n+4})$ to coordinates $(X_{m+3}, Y_{n+4})$, and the third determination unit 203f determines whether such a cell is the white color or the black color (Step S144 illustrated in FIG. 15B).

Here, a cell of the coordinates $(X_{m+1}, Y_{n+1})$ to the coordinates $(X_{m+2}, Y_{n+1})$ corresponds to the reflective cell C22 and is determined as the white color.

In addition, a cell of the coordinates $(X_{m+2}, Y_{n+1})$ to the coordinates $(X_{m+3}, Y_{n+1})$ corresponds to the light absorption cell C23 and is determined as the black color.

A cell of the coordinates $(X_{m+1}, Y_{n+2})$ to the coordinates $(X_{m+2}, Y_{n+2})$ corresponds to the light absorption cell C32 and is determined as the black color.

A cell of the coordinates $(X_{m+2}, Y_{n+2})$ to the coordinates $(X_{m+3}, Y_{n+2})$ corresponds to the reflective cell C33 and is determined as the white color.

A cell of the coordinates $(X_{m+1}, Y_{n+3})$ to the coordinates $(X_{m+2}, Y_{n+3})$ corresponds to the reflective cell C42 and is determined as the white color.

In addition, a cell of the coordinates $(X_{m+2}, Y_{n+3})$ to the coordinates $(X_{m+3}, Y_{n+3})$ corresponds to the light absorption cell C43 and is determined as the black color.

A cell of the coordinates $(X_{m+1}, Y_{n+4})$ to the coordinates $(X_{m+2}, Y_{n+4})$ corresponds to the light absorption cell C52 and is determined as the black color.

A cell of the coordinates $(X_{m+2}, Y_{n+4})$ to the coordinates $(X_{m+3}, Y_{n+4})$ corresponds to the reflective cell C53 and is determined as the white color.

Next, the third determination unit 203f reads a binary code acquired in a case in which each cell determined as the white color is set to 1, and each cell determined as the black color is set to 0 on the basis of the scanning result acquired in Step S144 and transforms the read binary code into a decimal number (Step S145 illustrated in FIG. 15B).

Here, the reflective cell C22, the light absorption cell C23, the light absorption cell C32, the reflective cell C33, the reflective cell C42, the light absorption cell C43, the light absorption cell C52, and the reflective cell C53 scanned in Step S144 are respectively determined as the white color, the black color, the black color, the white color, the white color, the black color, the black color, and the white color in Step S144. Thus, in Step S145, 10011001 is read as the binary code and is transformed into 153 ($=2^7 \times 1 + 2^6 \times 0 + 2^5 \times 0 + 2^4 \times 1 + 2^3 \times 1 + 2^2 \times 0 + 2^1 \times 0 + 2^0 \times 1$) as a decimal number.

Next, the third determination unit 203f determines whether or not a marker ID corresponding to the decimal number transformed in Step S145 is present in a table (FIG. 13) stored in the storage unit 205b (Step S146 illustrated in FIG. 15B).

In a case in which the third determination unit 203f determines that a marker ID corresponding to the transformed decimal number is not present (No in Step S146 illustrated in FIG. 15B), the process of Step S147 is performed.

In other words, the third determination unit 203f adds 1 to the variable n (Step S147 illustrated in FIG. 15B) and performs the process of Step S102.

On the other hand, in a case in which the third determination unit 203f determines that a marker ID corresponding to the transformed decimal number is present (Yes in Step S146 illustrated in FIG. 15B), the process of Step S148 is performed.

In other words, the acquisition unit 204 acquires control information associated with the marker ID corresponding to the decimal number transformed in Step S145 by reading the control information from the storage unit 205b (Step S148 illustrated in FIG. 15B).

Here, since the decimal number acquired through the transformation in S145 is 153, the acquisition unit 204 acquires information of a predetermined operation, a marker distance, and a rotation angle corresponding to the marker ID of which the value is 153 as control information.

Next, the third determination unit 203f acquires center of gravity coordinates of the detected marker (Step S149 illustrated in FIG. 15B). For example, the third determination unit 203f acquires an X coordinate of the center of gravity of the marker 30d using an equation "$(X_m+X_{m+3})/2$", and $Y_{n+2}$ is used as a Y coordinate of the center of gravity of the marker 30d.

Next, the drive unit 27 controls operations (translation and turning) of the mobile body 20 on the basis of the control information acquired in Step S148 (Step S150 illustrated in FIG. 15B).

After the drive unit 27 performs the control of Step S150, the process of Step S101 is performed.

FIG. 16 is a diagram illustrating a process performed using the image processing unit 201c according to the third embodiment of the present invention.

FIG. 16 illustrates an example of an image 50d captured by the imaging unit 23. In the image 50d, an image corresponding to cells of a matrix shape of 5 rows×3 columns corresponding to the marker 30d (FIG. 14) is included. The horizontal direction of FIG. 16 represents the X axis direction, and a vertical direction of FIG. 16 represents the Y axis direction. Coordinates (X, Y) of an upper end and a left end of the image 50d are $(X_0, Y_0)$.

In a process of Step S102 illustrated in FIG. 15A, the first scanning unit 202a performs scanning P21 for an area of the image 50d of which the Y coordinate illustrated in FIG. 16 is $Y_n$ and which is an area (also referred to as a first area) set by an area $A_2$ and an area $B_{21}$ from the left side of the image 50d to the right side thereof.

In a process of Step S106 illustrated in FIG. 15A, X coordinates $X_m$, $X_{m+1}$, $X_{m+2}$, and $X_{m+3}$ that are boundary positions of the pattern of the white color, the black color, and the white color detected in Step S103 and are boundary positions illustrated in FIG. 16 are acquired by the first determination unit 203a.

In addition, by calculating a difference between the X coordinate $X_m$ and the X coordinate $X_{m+1}$, a width $w_1$ of the white pattern corresponding to the reflective cell C11 is acquired. Furthermore, by calculating a difference between the X coordinate $X_{m+1}$ and the X coordinate $X_{m+2}$, a width $w_2$ of the black pattern corresponding to the light absorption cell C12 is acquired. In addition, by calculating a difference between the X coordinate $X_{m+2}$ and the X coordinate $X_{m+3}$, a width $w_3$ of the white pattern corresponding to the reflective cell C13 is acquired.

Furthermore, in a process of Step S107 illustrated in FIG. 15A, by acquiring a value of a half of the difference between the X coordinate $X_m$ and the X coordinate $X_{m+1}$ using the first determination unit 203a, an X coordinate $X_S$ representing the center of the width $w_1$ is acquired.

In a process of Step S108 illustrated in FIG. 15A, the second scanning unit 202b performs scanning P22 for an area of the image 50d of which the X coordinate illustrated in FIG. 16 is $X_S$ and which is an area (also referred to as a second area) set by an area $A_{21}$ and an area $B_2$ from the upper side of the image 50d to the lower side thereof.

In the process of Step S142 illustrated in FIG. 15B, by using the second determination unit 203e, on the basis of the boundary positions of the pattern of the white color, the black color, the white color, the black color, and the white color detected in Step S108 illustrated in FIG. 15A, a height $h_1$ of the white pattern corresponding to the reflective cell C11 is acquired, a height $h_2$ of the black pattern corresponding to the light absorption cell C21 is acquired, a height $h_3$ of the white pattern corresponding to the reflective cell C31 is acquired, a height $h_4$ of the black pattern corresponding to the light absorption cell C41 is acquired, and a height $h_5$ of the white pattern corresponding to the reflective cell C51 is acquired.

In a process of Step S144 illustrated in FIG. 15B, the third scanning unit 202d performs scanning P23, P24, P25, and P26 for an area of the image 50d of which the Y coordinates illustrated in FIG. 16 are $Y_{n+1}$, $Y_{n+2}$, $Y_{n+3}$, and $Y_{n+4}$ and which is an area (also referred to as a third area) set by an area $A_{22}$ and an area $B_{22}$ from the left side of the image 50d to the right side thereof.

In the third embodiment, in a case in which a reflective cell C11 (first information), a light absorption cell C21 (second information), a reflective cell C31 (the first information), a light absorption cell C41 (the second information), and a reflective cell C51 (the first information) are sequentially detected in a second scanning result, the second determination unit 203e determines that a second condition (the condition of Step S140 illustrated in FIG. 15A) is satisfied.

A probability of the pattern of the reflective cell C11, the light absorption cell C21, the reflective cell C31, the light absorption cell C41, and the reflective cell C51 being included in the vertical direction (second direction) is lower than a probability of the pattern of the third reflective cell and the second light absorption cell being included in the second direction. Thus, according to the third embodiment, the possibility of erroneous determination of a pattern other than the marker 30d as a marker can be decreased.

Fourth Embodiment

Next, a fourth embodiment of the present invention will be described. Description of parts in which the fourth embodiment takes configurations similar to those of the third embodiment and performs processes similar to those of the third embodiment will be omitted.

Figure 17:
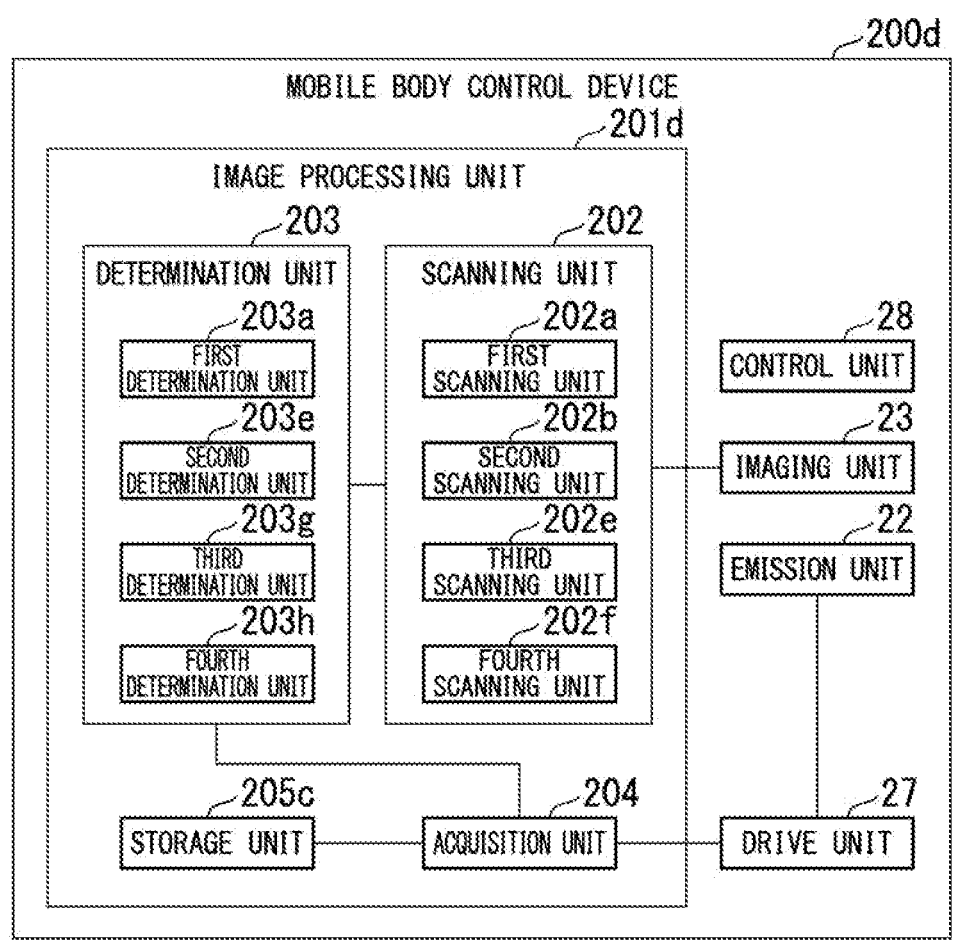
FIG. 17 is a block diagram illustrating the configuration of a mobile body control device built into a mobile body according to a fourth embodiment of the present invention.

FIG. 17 is a block diagram illustrating the configuration of a mobile body control device 200d built into a mobile body 20 according to a fourth embodiment of the present invention.

An image processing unit 201d of the mobile body control device 200d (FIG. 17) according to the fourth embodiment includes a storage unit 205c in place of the storage unit 205b of the mobile body control device 200c (FIG. 12) according to the third embodiment.

In addition, a scanning unit 202 of the mobile body control device 200d (FIG. 17) according to the fourth embodiment includes not the first scanning unit 202a, the second scanning unit 202b, and the third scanning unit 202d included in the scanning unit 202 (FIG. 12) according to the third embodiment but a first scanning unit 202a, a second scanning unit 202b, a third scanning unit 202e, and a fourth operation unit 202f.

In addition, a determination unit 203 of the mobile body control device 200d (FIG. 17) according to the fourth embodiment includes not the first determination unit 203a, the second determination unit 203e, and the third determination unit 203f included in the determination unit 203 (FIG. 12) according to the third embodiment but a first determination unit 203a, a second determination unit 203e, a third determination unit 203g, and a fourth determination unit 203h.

FIG. 18 is a diagram illustrating an example of information stored by the storage unit 205c (FIG. 17) according to the fourth embodiment of the present invention. The storage unit 205c is a storage device such as a memory.

In FIG. 18, control information of a predetermined operation (for example, stopping), a marker distance (for example, 1 m), a rotation angle (for example, 0 degrees), and the like is associated with a marker ID (for example, 0). In addition, in FIG. 18, only control information of which marker IDs are 0 to 4 is illustrated, and illustration of details of control information of which marker IDs are 5 to 63 is omitted.

In the table of FIG. 18, marker IDs of 0 to 63 are included. In other words, in the table of FIG. 18, a total of 64 marker IDs are included, and control information of 64 kinds can be set.

For example, in a case in which the acquisition unit 204 reads information of which a marker ID is 0 from the storage unit 205c and outputs the read information to the drive unit 27, the mobile body 20 is translated to a position at which a distance between the mobile body 20 and the marker 30d is a marker distance (that is, 1 m) without rotating (in other words, a rotation angle of 0 degrees) until the next marker is read and performs a predetermined operation (that is, stopping).

In addition, in the fourth embodiment, a case in which the same marker as the marker 30d (FIG. 14) used in the third embodiment is used will be described.

Figure 19A:
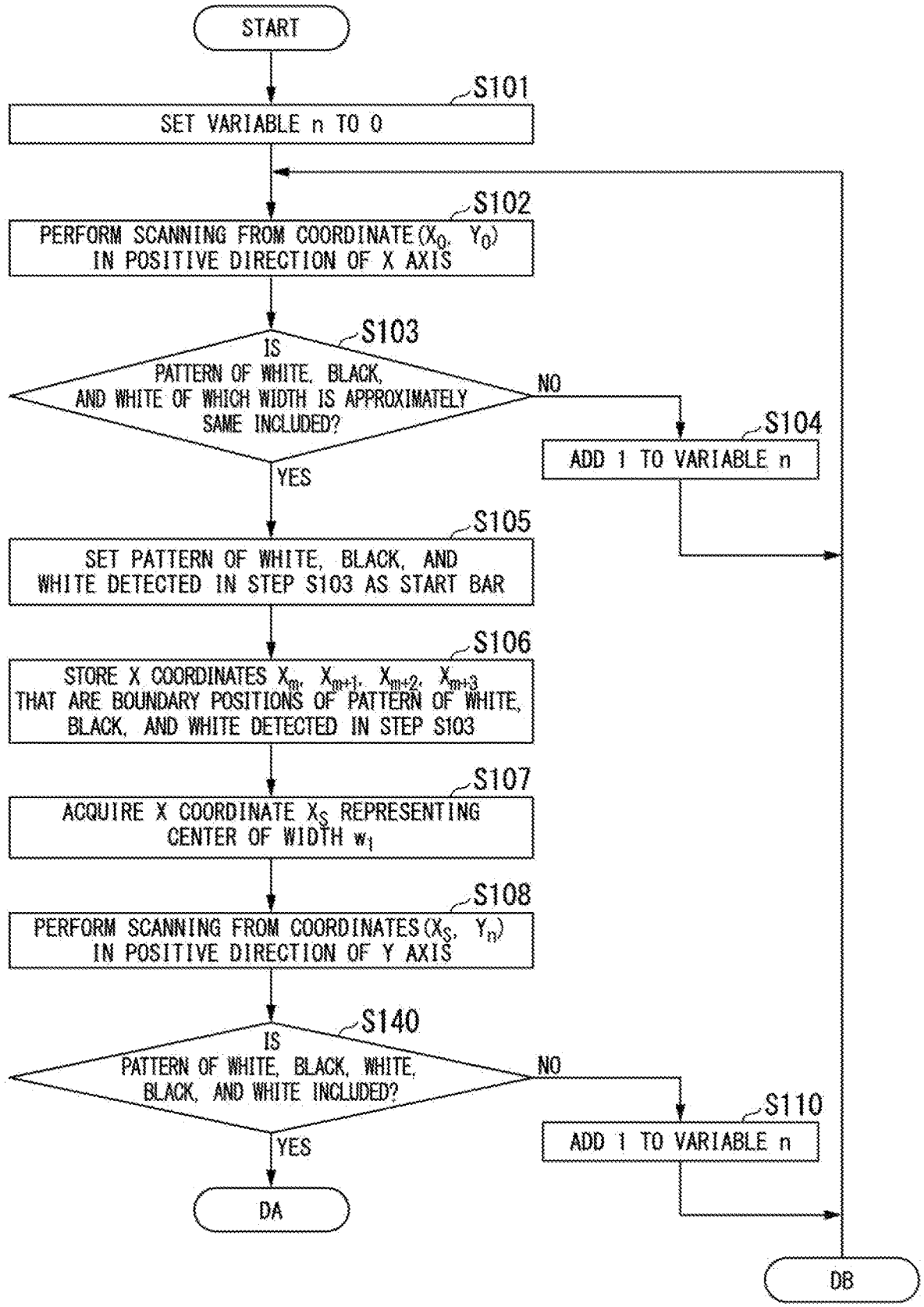
FIG. 19A is a flowchart illustrating a process of the mobile body control device according to the fourth embodiment of the present invention.
Figure 19B:
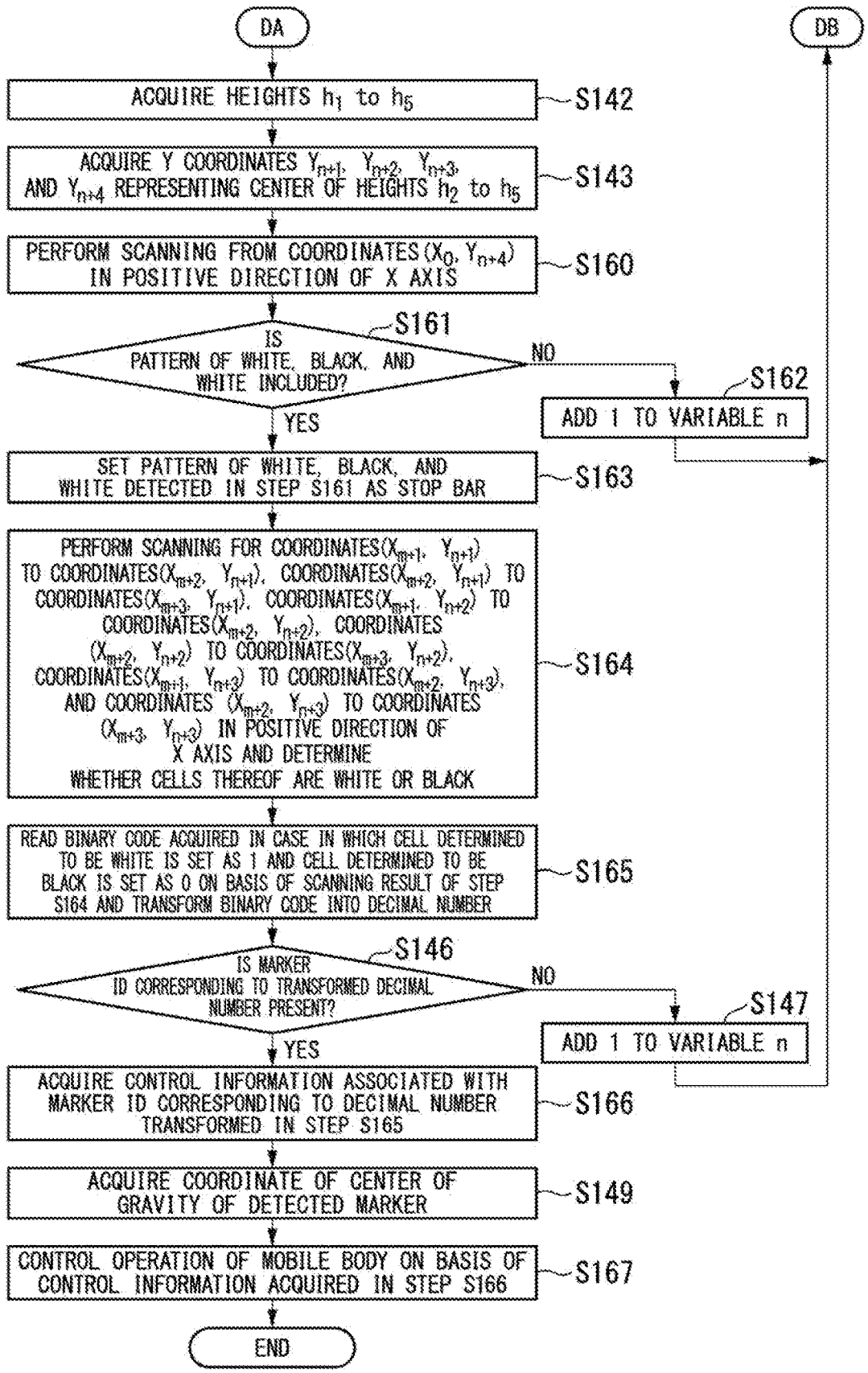
FIG. 19B is a flowchart illustrating a process of the mobile body control device according to the fourth embodiment of the present invention.

FIGS. 19A and 19B represent a flowchart illustrating a process of the mobile body control device 200d (FIG. 17) according to the fourth embodiment of the present invention. In the flowchart illustrated in FIGS. 19A and 19B according to the fourth embodiment, the same reference signs are assigned to parts performing processes similar to those of the flowchart according to the third embodiment illustrated in FIGS. 15A and 15B, and description of such processes will be omitted.

In the flowchart according to the third embodiment illustrated in FIGS. 15A and 15B, after Step S140, the process of Step S141 (FIG. 15A) is performed. However, in the flowchart according to the fourth embodiment illustrated in FIGS. 19A and 19B, in a case in which the second determination unit 203e determines that the pattern of the white color, the black color, the white color, the black color, and the white color is included (Yes in Step S140 illustrated in FIG. 19A), the process of Step S142 illustrated in FIG. 19B is performed.

In addition, in the flowchart according to the fourth embodiment illustrated in FIG. 19B, after Step S143, the process of Step S160 is performed. In other words, the fourth scanning unit 202f scans an image captured by the imaging unit 23 from coordinates $(X_0, Y_{n+4})$ in the positive direction of the X axis (Step S160 illustrated in FIG. 19B).

Next, in Step S160, the fourth determination unit 203h determines whether or not a pattern of the white color, the black color, and the white color having an approximately the same width is included in a scanning result acquired by the fourth scanning unit 202f (Step S161 illustrated in FIG. 19B).

In Step S161, in a case in which the fourth determination unit 203h determines that the pattern of the white color, the black color, and the white color having approximately the same width is not included in the scanning result acquired by the fourth scanning unit 202f (No in Step S161 illustrated in FIG. 19B), the process of Step S162 is performed.

In other words, the first scanning unit 202a adds 1 to the variable n (Step S162 illustrated in FIG. 19B), and the process of Step S102 illustrated in FIG. 19A is performed.

On the other hand, in Step S161, in a case in which the fourth determination unit 203h determines that the pattern of the white color, the black color, and the white color having approximately the same width is included in the scanning result acquired by the fourth scanning unit 202f (Yes in Step S161 illustrated in FIG. 19B), the process of Step S163 is performed.

In other words, the fourth determination unit 203h regards the pattern of the white color, the black color, and the white color detected in Step S161 as the reflective cell C51, the light absorption cell C52, and the reflective cell C53 of the marker 30d (FIG. 14) and sets the pattern of the white color, the black color, and the white color detected in Step S161 as a stop bar (Step S163 illustrated in FIG. 19B).

Next, the third scanning unit 202e scans an image captured by the imaging unit 23 in the positive direction of the X axis for coordinates $(X_{m+1}, Y_{n+1})$ to coordinates $(X_{m+2}, Y_{n+1})$, coordinates $(X_{m+2}, Y_{n+1})$ to coordinates $(X_{m+3}, Y_{n+1})$, coordinates $(X_{m+1}, Y_{n+2})$ to coordinates $(X_{m+2}, Y_{n+2})$, coordinates $(X_{m+2}, Y_{n+2})$ to coordinates $(X_{m+3}, Y_{n+2})$, coordinates $(X_{m+1}, Y_{n+3})$ to coordinates $(X_{m+2}, Y_{n+3})$, and coordinates $(X_{m+2}, Y_{n+3})$ to coordinates $(X_{m+3}, Y_{n+3})$, and the fourth determination unit 203h determines whether such a cell is the white color or the black color (Step S164 illustrated in FIG. 19B).

Next, the third determination unit 203g reads a binary code acquired in a case in which each cell determined as the white color is set to 1, and each cell determined as the black color is set to 0 on the basis of the scanning result acquired in Step S164 and transforms the read binary code into a decimal number (Step S165 illustrated in FIG. 19B), and the process of Step S146 is performed.

In a case in which the third determination unit 203g determines that a marker ID corresponding to the transformed decimal number is present (Yes in Step S146 illustrated in FIG. 19B), the process of Step S166 is performed.

In other words, the acquisition unit 204 acquires control information associated with the marker ID corresponding to the decimal number transformed in Step S165 by reading the control information from the storage unit 205c (Step S166 illustrated in FIG. 19B), and the process of Step S149 is performed.

After the process of Step S149 is performed, the drive unit 27 controls operations (translation and turning) of the mobile body 20 on the basis of the control information acquired in Step S166 (Step S167 illustrated in FIG. 19B).

Figure 20:
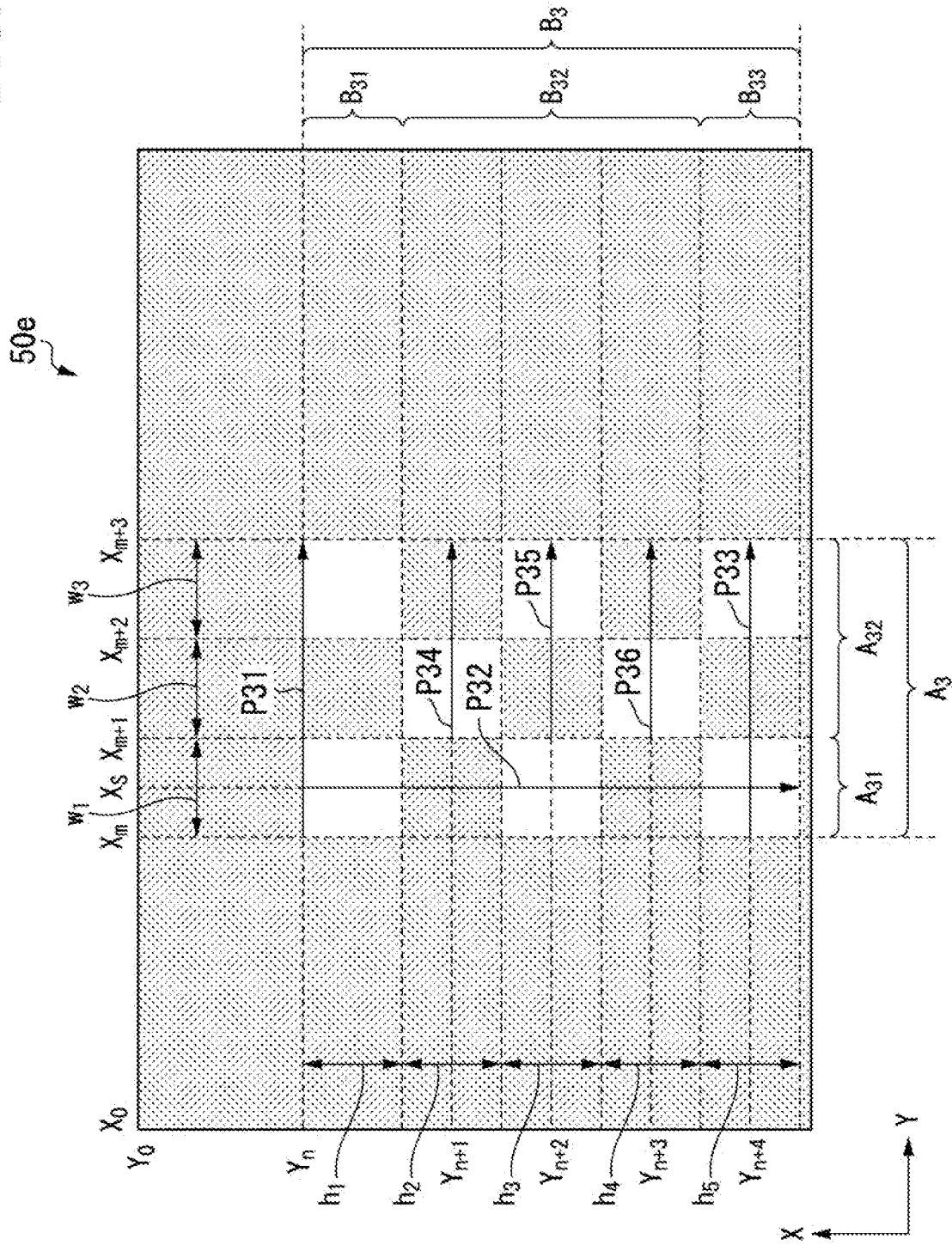
FIG. 20 is a diagram illustrating a process performed using an image processing unit according to the fourth embodiment of the present invention.

FIG. 20 is a diagram illustrating a process performed using the image processing unit 201d according to the fourth embodiment of the present invention.

FIG. 20 illustrates an example of an image 50e captured by the imaging unit 23. In the image 50e, an image corresponding to cells of a matrix shape of 5 rows×3 columns corresponding to the marker 30d (FIG. 14) is included. The horizontal direction of FIG. 20 represents the X axis direction, and a vertical direction of FIG. 20 represents the Y axis direction. Coordinates (X, Y) of an upper end and a left end of the image 50e are ($X_0$, $Y_0$).

In a process of Step S102 illustrated in FIG. 19A, the first scanning unit 202a performs scanning P31 for an area of the image 50e of which the Y coordinate illustrated in FIG. 20 is $Y_n$ and which is an area (also referred to as a first area) set by an area $A_3$ and an area $B_{31}$ from the left side of the image 50e to the right side thereof.

In a process of Step S106 illustrated in FIG. 19A, X coordinates $X_m$, $X_{m+1}$, $X_{m+2}$, and $X_{m+3}$ that are boundary positions of the pattern of the white color, the black color, and the white color detected in Step S103 and are boundary positions illustrated in FIG. 20 are acquired by the first determination unit 203a.

In a process of Step S108 illustrated in FIG. 19A, the second scanning unit 202b performs scanning P32 for an area of the image 50e of which the X coordinate illustrated in FIG. 20 is $X_S$ and which is an area (also referred to as a second area) set by an area $A_{31}$ and an area $B_3$ from the upper side of the image 50e to the lower side thereof.

In the process of Step S142 illustrated in FIG. 19B, by using the second determination unit 203e, on the basis of the boundary positions of the pattern of the white color, the black color, the white color, the black color, and the white color detected in Step S108, a height $h_1$ of the white pattern corresponding to the reflective cell C11 is acquired, a height $h_2$ of the black pattern corresponding to the light absorption cell C21 is acquired, a height $h_3$ of the white pattern corresponding to the reflective cell C31 is acquired, a height $h_4$ of the black pattern corresponding to the light absorption cell C41 is acquired, and a height $h_5$ of the white pattern corresponding to the reflective cell C51 is acquired.

In a process of Step S160 illustrated in FIG. 19B, the fourth scanning unit 202f performs scanning P33 for an area of the image 50e of which the Y coordinate illustrated in FIG. 20 is an area of $Y_{n+4}$ and which is an area (also referred to as a fourth area) set by an area $A_3$ and an area $B_{33}$ from the left side of the image 50e to the right side thereof.

In a process of Step S164 illustrated in FIG. 19B, the third scanning unit 202e performs scanning P34, P35, and P36 for an area of the image 50e of which the Y coordinates illustrated in FIG. 20 are $Y_{n+1}$, $Y_{n+2}$, and $Y_{n+3}$ and which is an area (also referred to as a third area) set by an area $A_{32}$ and an area $B_{32}$ from the left side of the image 50e to the right side thereof.

In the third embodiment, in a case in which the first determination unit 203a sequentially detects the reflective cell C11, the light absorption cell C12, and the reflective cell C13 in the first scanning result, and thereafter the second determination unit 203b sequentially detects the reflective cell C11, the light absorption cell C21, the reflective cell C31, the light absorption cell C41, and the reflective cell C51 in the second scanning result, the third scanning unit 202d scans the third area.

On the other hand, in the fourth embodiment, in a case in which the first determination unit 203a sequentially detects the reflective cell C11, the light absorption cell C12, and the reflective cell C13 in the first scanning result (in other words, in a case in which the first condition is satisfied), thereafter, in a case in which the second determination unit 203b sequentially detects the reflective cell C11, the light absorption cell C21, the reflective cell C31, the light absorption cell C41, and the reflective cell C51 in the second scanning result (in other words, it is determined that the second condition is satisfied), and in a case in which the fourth determination unit 203h sequentially detects the reflective cell C51, the light absorption cell C52, and the reflective cell C53 (in other words, it is determined that the fourth condition is satisfied), the third scanning unit 202e scans the third area.

A probability of detecting the marker 30d in accordance with the fourth embodiment is lower than a probability of detecting the marker 30d in accordance with the third embodiment. Thus, according to the fourth embodiment, the possibility of erroneous determination of a pattern other than the marker 30d as a marker can be lower than that of the third embodiment.

As above, although preferred embodiments of the present invention have been described with reference to the drawings, the present invention is not limited to the embodiments described above. Shapes, combinations, and the like of constituent members represented in the embodiments described above are examples, and various changes can be made on the basis of design requests and the like in a range not departing from the gist of the present invention.

For example, in the first embodiment described above, a case in which the marker 30a (FIG. 4) is configured from a pattern of a matrix shape of 3 rows×3 columns has been described. However, the configuration of the marker is not limited to such a form. In a case in which the number of rows of the marker is two or more, and the number of columns is two or more, the first embodiment can be applied.

In addition, in the first embodiment described above, a case in which the marker 30a (FIG. 4) is composed of reflective cells and light absorption cells having a square shape has been described. However, the present invention is not limited to such a form. For example, the marker may be configured such that a ratio of the height of a cell of the first row, the height of a cell of the second row, and the height of a cell of the third row of the marker 30a is 1:1:2. By configuring as such, the probability of detection of a cell of the third row can be improved.

In addition, in the first embodiment described above, a case in which the first scanning unit 202a performs scanning in the horizontal direction, and thereafter, the second scanning unit 202b performs scanning in the vertical direction has been described. However, the present invention is not limited to such a form. For example, after the first scanning unit 202a performs scanning in the vertical direction, the second scanning unit 202b may perform scanning in the horizontal direction.

In addition, in the first embodiment described above, as illustrated in FIG. 3, a case in which a table in which each marker ID and control information are associated with each other is stored in the storage unit 205a, markers 30a are attached to a passage of a factory, the mobile body 20 images the marker 30a and reads control information associated with a marker ID of the marker 30a from the storage unit 205a, whereby the mobile body 20 is controlled has been described. However, the present invention is not limited to such a form. For example, by attaching markers to which unique marker IDs are assigned to a passage of a factory and providing a reception unit in the mobile body 20, a manager of the mobile body control system may change details of control information afterwards by transmitting control information corresponding to each marker ID to the reception unit of the mobile body 20.

Alternatively, together with sequentially attaching markers to which consecutive marker IDs are assigned in a passage of a factory, a table in which each marker ID and control information are associated with other may be stored in the storage unit 205a of the mobile body 20. Then, markers to which consecutive marker IDs are assigned are sequentially imaged using the imaging unit 23 of the mobile body 20, and the operation of the mobile body 20 may be controlled on the basis of control information associated with each marker ID. In such a case, for example, in a case in which a plurality of markers are included in an image captured by the imaging unit 23, a marker of which an area in the image is the largest may be determined as a marker that is a target for image processing.

In addition, in the first embodiment described above, a case in which the emission unit 22 emits the infrared light L1 has been described. However, the present invention is not limited to such a form, and the emission unit 22 may be configured to emit light other than the infrared light L1. In addition, without providing the emission unit 22 in the mobile body 20, reflective light, which is based on natural light, from the marker 30a may be captured by the imaging unit 23.

In addition, in the first embodiment, in a case in which, in accordance with first scanning using the first scanning unit 202a, a reflective cell is detected as a cell of the first row and the first column, a light absorption cell is detected as a cell of the first row and the second column, and a reflective cell is detected as a cell of the first row and the third column, it is determined that the start bar has been detected (Step S105 illustrated in FIG. 5A). Furthermore, in the first embodiment, in a case in which, in accordance with second scanning using the second scanning unit 202b, a reflective cell is detected as a cell of the first row and the first column, a light absorption cell is detected as a cell of the second row and the first column, and a reflective cell is detected as a cell of the third row and the first column, it is determined that the stop bar has been detected (Step S111 illustrated in FIG. 5A). However, the present invention is not limited to such a form.

For example, in the marker 30a illustrated in FIG. 4, the reflective cells C11, C13, and C31 may be replaced with light absorption cells, the light absorption cells C12 and C21 may be replaced with reflective cells, and the marker 30a may be coated with a material used for reflective cells to surround the vicinity thereof. In this case, for example, in a case in which the imaging unit 23 of the mobile body 20 detects a reflective pattern coated in a frame shape, a reflective cell or a light absorption cell arranged inside the frame is detected. For example, in a case in which, in accordance with first scanning using the first scanning unit 202a, a light absorption cell is detected as a cell of the first row and the first column, a reflective cell is detected as a cell of the first row and the second column, and a light absorption cell is detected as a cell of the first row and the third column, it may be determined that the start bar has been detected. In addition, in a case in which, in accordance with second scanning using the second scanning unit 202b, a light absorption cell is detected as a cell of the first row and the first column, a reflective cell is detected as a cell of the second row and the first column, and a light absorption cell is detected as a cell of the third row and the first column, it may be determined that the stop bar has been detected.

In addition, in the first embodiment, a case in which the marker 30a illustrated in FIG. 4 is composed of reflective cells and light absorption cells has been described. However, the present invention is not limited to such a form. For example, by forming an area of reflective cells in the marker 30a illustrated in FIG. 4 in a convex shape and forming an area of light absorption cells in a concave shape, it may be determined whether each of the cells C11, C12, C13, C21, C22, C23, C31, C32, and C33 is first information having high reflectivity or second information having low reflectivity on the basis of a difference in the reflectivity thereof.

In addition, the process of each of the units illustrated in FIGS. 2, 10, 12, and 17 may be performed by recording a program used for realizing the functions of the units illustrated in FIGS. 2, 10, 12, and 17 on a computer readable recording medium and causing a computer system to read and execute the program recorded on this recording medium. A "computer system" described here includes an OS and hardware such as peripheral devices. In addition, the "computer system" also includes a WWW system having a home page providing environment (or a display environment). A "computer-readable recording medium" represents a portable medium such as a flexible disk, a magneto-optical disc, a ROM, or a CD-ROM, a storage device such as a hard disk built in a computer system, and the like. Furthermore, a "computer-readable recording medium" includes a medium that stores a program for a predetermined time such as a volatile memory (RAM) disposed inside a computer system that serves as a server or a client in a case in which the program is transmitted through a network such as the Internet or a communication line such as a telephone line.

INDUSTRIAL APPLICABILITY

The present invention can be applied to an image processing device and a mobile body control system.

REFERENCE SIGNS LIST

10 Mobile body control system
20 Mobile body
21 Vehicle body
22 Emission unit
23 Imaging unit
24a Front wheel tire
24b Rear wheel tire
27 Drive unit
28 Control unit
30a, 30b Marker
200a, 200b, 200c, 200d Mobile body control device
201a, 201b, 201c, 201d Image processing unit
202 Scanning unit
202a First scanning unit
202b Second scanning unit
202c, 202d, 202e Third scanning unit
202f Fourth scanning unit
203 Determination unit
203a First determination unit
203b, 203d, 203e Second determination unit
203c, 203f, 203g Third determination unit
203h Fourth determination unit
204 Acquisition unit
205a, 205b, 205c Storage unit

What is claimed is:
1. An image processing device comprising:
a first scanning unit configured to scan a first area of an image acquired on the basis of reflective light of light emitted to the outside of a mobile body in a first direction;

a first determination unit configured to determine whether or not a first condition is satisfied on the basis of a first scanning result acquired by the first scanning unit;

a second scanning unit configured to scan a second area of the image in a second direction different from the first direction in a case in which the first determination unit determines that the first condition is satisfied;

a second determination unit configured to determine whether or not a second condition is satisfied on the basis of a second scanning result acquired by the second scanning unit;

a third scanning unit configured to scan a third area of the image after the second determination unit determines that the second condition is satisfied; and a third determination unit configured to determine whether or not predetermined information is included in the third area scanned by the third scanning unit, wherein the third area is an area other than the first area and the second area in a rectangular area including the first area and the second area.

2. The image processing device according to claim 1, wherein the first determination unit determines that the first condition is satisfied in a case in which first information, second information, and the first information are sequentially detected in the first scanning result, and a width of each area in which such information is detected is approximately the same as a predetermined width.

3. The image processing device according to claim 1, wherein the second determination unit determines that the second condition is satisfied in a case in which first information, second information, and the first information are sequentially detected in the second scanning result.

4. The image processing device according to claim 1, wherein the second determination unit determines that the second condition is satisfied in a case in which first information, second information, and the first information are sequentially detected in the second scanning result, and a height of each area in which such information is detected is approximately the same as a predetermined height.

5. The image processing device according to claim 2, wherein the second determination unit uses any one piece of the first information detected by the first scanning unit as the first information detected first by the second determination unit.

6. The image processing device according to claim 1, further comprising an acquisition unit configured to acquire control information used for controlling an operation of the mobile body in a case in which the third determination unit determines that the predetermined information is included in the third area.

7. A mobile body control system comprising:
a marker including a plurality of pieces of first information and a plurality of pieces of second information arranged in a matrix shape; and
a mobile body,
wherein the mobile body includes:
an emission unit configured to emit light to the marker;
an imaging unit configured to capture an image on the basis of reflective light of the light emitted by the emission unit;
a first scanning unit configured to scan a first area of the image in a first direction;
a first determination unit configured to determine whether or not a first condition is satisfied on the basis of a first scanning result acquired by the first scanning unit;
a second scanning unit configured to scan a second area of the image in a second direction different from the first direction in a case in which the first determination unit determines that the first condition is satisfied;
a second determination unit configured to determine whether or not a second condition is satisfied on the basis of a second scanning result acquired by the second scanning unit;
a third scanning unit configured to scan a third area of the image after the second determination unit determines that the second condition is satisfied; and
a third determination unit configured to determine whether or not predetermined information is included in the third area scanned by the third scanning unit.

8. The image processing device according to claim 3, wherein the second determination unit uses any one piece of the first information detected by the first scanning unit as the first information detected first by the second determination unit.

9. The image processing device according to claim 4, wherein the second determination unit uses any one piece of the first information detected by the first scanning unit as the first information detected first by the second determination unit.

10. The image processing device according to claim 1, wherein
in a case in which first information, second information, and the first information are sequentially detected in the first scanning result,
the second scanning unit scans the second area of the image in the second direction from a scanning start position which is set on the basis of the first scanning result, the scanning start position being an area in which any one piece of the first information is detected by the first scanning unit.

* * * * *